(12) United States Patent
Ishimi et al.

(10) Patent No.: US 12,384,165 B2
(45) Date of Patent: Aug. 12, 2025

(54) PRINT APPARATUS, CONTROL METHOD OF THE SAME, PRINTHEAD, AND PRINT SYSTEM

(71) Applicant: CANON KABUSHIKI KAISHA, Tokyo (JP)

(72) Inventors: Keita Ishimi, Kanagawa (JP); Takaaki Shima, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 159 days.

(21) Appl. No.: 17/949,685

(22) Filed: Sep. 21, 2022

(65) Prior Publication Data

US 2023/0092169 A1   Mar. 23, 2023

(30) Foreign Application Priority Data

Sep. 22, 2021 (JP) ................................. 2021-154711
Jul. 13, 2022 (JP) ................................. 2022-112573

(51) Int. Cl.
*B41J 2/175* (2006.01)
*G06K 15/02* (2006.01)

(52) U.S. Cl.
CPC ...... *B41J 2/17566* (2013.01); *G06K 15/1823* (2013.01); *B41J 2002/17569* (2013.01)

(58) Field of Classification Search
CPC ......... C09D 11/38; C09D 11/54; C09D 11/00; C09D 11/037; C09D 11/30; B41J 2/21; B41J 2/2114; B41M 3/14
See application file for complete search history.

(56) References Cited

U.S. PATENT DOCUMENTS 6,471,348 B1   10/2002   Koitabashi
6,779,873 B2 *  8/2004   Maeda .................. B41J 2/2132
                                                            347/41

(Continued)

FOREIGN PATENT DOCUMENTS

CN   1775534 A    5/2006
EP   0 918 433 A2  5/1999

(Continued)

OTHER PUBLICATIONS

Extended European Search Report dated Feb. 10, 2023, in European Patent Application No. 22195751.7.

(Continued)

*Primary Examiner* — John Zimmermann
(74) *Attorney, Agent, or Firm* — Venable LLP

(57) ABSTRACT

A print unit includes a reactive liquid element row in which a plurality of print elements are arrayed in a first direction, a first element row in which a plurality of print elements are arrayed in the first direction, and a second element row in which a plurality of print elements are arrayed in the first direction. The reactive liquid element row, the first element row, and the second element row are arrayed in this order in a second direction perpendicular to the first direction. A scan unit scans the print unit in the second direction. A print control unit controls a print operation by the print unit such that a ratio of the number of pixels permitted to eject the second ink to the number of pixels in a predetermined region on the print medium does not exceed a threshold.

22 Claims, 11 Drawing Sheets

(56) References Cited

U.S. PATENT DOCUMENTS

| | | | | |
|---|---|---|---|---|
| 6,848,781 B2* | 2/2005 | Ogino | ................ | B41M 5/0017 |
| | | | | 347/100 |
| 7,614,734 B2* | 11/2009 | Konno | ................ | B41J 2/2114 |
| | | | | 347/100 |
| 7,654,662 B2 | 2/2010 | Nakazawa et al. | | |
| 2004/0135864 A1 | 7/2004 | Ogino et al. | | |
| 2013/0271526 A1* | 10/2013 | Ciampini | ............... | C09D 11/54 |
| | | | | 523/400 |
| 2016/0168453 A1* | 6/2016 | Florio | ................ | C04B 35/622 |
| | | | | 507/203 |
| 2016/0230030 A1* | 8/2016 | Tominaga | .............. | C09D 11/38 |
| 2018/0304625 A1 | 10/2018 | Kayahara et al. | | |
| 2019/0322888 A1* | 10/2019 | Ciampini | ............. | C09D 11/328 |

FOREIGN PATENT DOCUMENTS

| | | |
|---|---|---|
| GB | 2 357 997 A | 7/2001 |
| JP | 11-048462 A | 2/1999 |
| JP | 11-48463 A | 2/1999 |
| JP | 2010-089425 A | 4/2010 |
| JP | 2011-110755 A | 6/2011 |
| JP | 2019-177510 A | 10/2019 |

OTHER PUBLICATIONS

Office Action dated Jun. 25, 2025, in Chinese Patent Application No. 202211135745.X.

* cited by examiner

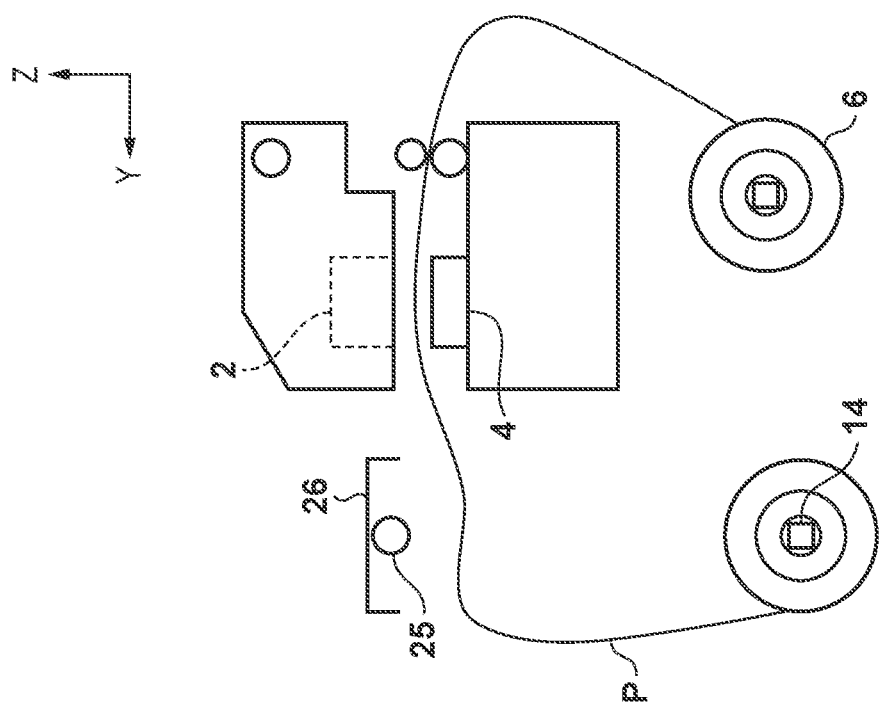
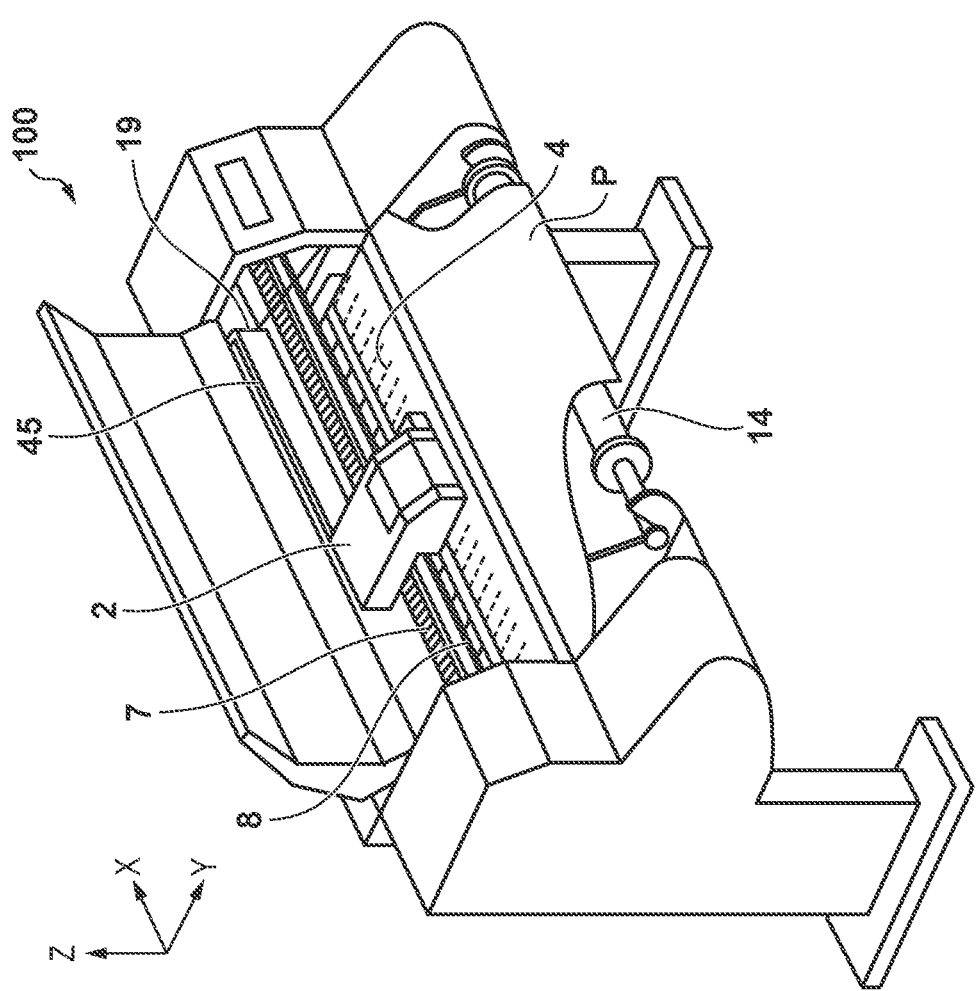

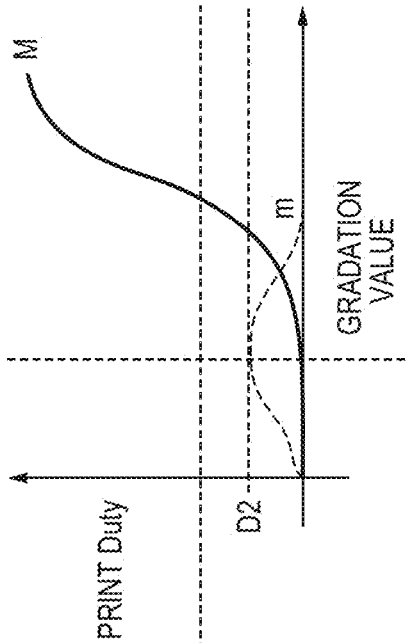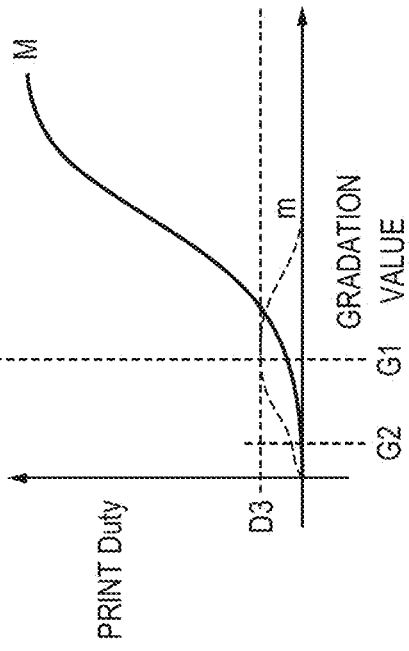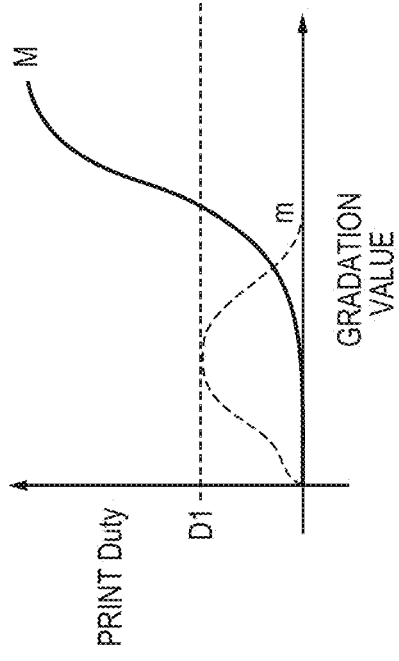

PRINT APPARATUS, CONTROL METHOD OF THE SAME, PRINTHEAD, AND PRINT SYSTEM

BACKGROUND OF THE INVENTION

Field of the Invention

The present invention relates to a print apparatus, a control method of the same, a printhead, and a print system.

Description of the Related Art

A print apparatus that prints an image on a print medium by ejecting ink from a printhead to the print medium is known. A print apparatus like this has been recently used in various applications, and various kinds of print media have been used accordingly. For example, a print apparatus capable of performing printing on a nonpermeable medium and a low-permeability medium has been proposed.

It is known that when printing an image on a print medium like this, a reactive liquid that suppresses ink bleed or beading by causing a phenomenon such as thickening by reacting with ink containing a coloring material is used in addition to the ink. When using this reactive liquid, however, a mist of the reactive liquid produced when the reactive liquid is ejected from an ejection port adheres to an ink ejection surface, and this sometimes causes defective ink ejection. To prevent this, Japanese Patent Laid-Open No. 2010-089425 has proposed an inkjet print apparatus that suppresses adhesion of mist to the ink ejection surface by sucking the mist in a head moving region (a platen upper portion) by an air suction mechanism.

SUMMARY OF THE INVENTION

According to one embodiment of the present invention, there is provided a print apparatus comprising: a print unit including a reactive liquid element row in which a plurality of print elements for applying a reactive liquid containing a component that reacts with a coloring material in ink are arrayed in a first direction, a first element row in which a plurality of print elements for applying first ink are arrayed in the first direction, and a second element row in which a plurality of print elements for applying second ink whose reactivity to the reactive liquid is lower than that of the first ink are arrayed in the first direction, the reactive liquid element row, the first element row, and the second element row being arrayed in this order in a second direction perpendicular to the first direction; a scan unit configured to scan the print unit in the second direction relatively to a print medium; and a print control unit configured to control a print operation by the print unit such that a ratio of the number of pixels permitted to eject the second ink to the number of pixels in a predetermined region on the print medium does not exceed a threshold.

According to another embodiment of the present invention, there is provided a control method of a print apparatus including: a print unit including a reactive liquid element row in which a plurality of print elements for applying a reactive liquid containing a component that reacts with a coloring material in ink are arrayed in a first direction, a first element row in which a plurality of print elements for applying first ink are arrayed in the first direction, and a second element row in which a plurality of print elements for applying second ink whose reactivity to the reactive liquid is lower than that of the first ink are arrayed in the first direction, the reactive liquid element row, the first element row, and the second element row being arrayed in this order in a second direction perpendicular to the first direction, the method comprising: scanning the print unit in the second direction relatively to a print medium; and controlling a print operation by the print unit such that a ratio of the number of pixels permitted to eject the second ink to the number of pixels in a predetermined region on the print medium does not exceed a threshold.

According to still another embodiment of the present invention, there is provided a printhead comprising a reactive liquid element row in which a plurality of print elements for applying a reactive liquid containing a component that reacts with a coloring material in ink are arrayed in a first direction, a first element row in which a plurality of print elements for applying first ink are arrayed in the first direction, and a second element row in which a plurality of print elements for applying second ink whose reactivity to the reactive liquid is lower than that of the first ink are arrayed in the first direction, wherein the reactive liquid element row, the first element row, and the second element row are arrayed in this order in a second direction perpendicular to the first direction.

According to still yet another embodiment of the present invention, there is provided a print system comprising: a print apparatus including a print unit including a reactive liquid element row in which a plurality of print elements for applying a reactive liquid containing a component that reacts with a coloring material in ink are arrayed in a first direction, a first element row in which a plurality of print elements for applying first ink are arrayed in the first direction, and a second element row in which a plurality of print elements for applying second ink whose reactivity to the reactive liquid is lower than that of the first ink are arrayed in the first direction, the reactive liquid element row, the first element row, and the second element row being arrayed in this order in a second direction perpendicular to the first direction, a scan unit configured to scan the print unit in the second direction relatively to a print medium, and a print control unit configured to control a print operation by the print unit; and an information processing apparatus including a determination unit configured to determine an application amount of the second ink based on input image data, such that the number of ejections per unit time of the second ink does not exceed a threshold, wherein the print control unit controls printing by the print unit based on the application amount determined by the determination unit.

Further features of the present invention will become apparent from the following description of exemplary embodiments (with reference to the attached drawings).

BRIEF DESCRIPTION OF THE DRAWINGS

Fig. 1A is a view showing the outer appearance of an inkjet print apparatus according to an embodiment;

FIG. 1B is a schematic view of a heating unit of the print apparatus;

FIG. 8A is a view showing an example of a table for a color conversion process;

FIG. 8B is a view showing another example of the table for the color conversion process;

FIG. 8C is a view showing still another example of the table for the color conversion process;

DESCRIPTION OF THE EMBODIMENTS

Figure 2:
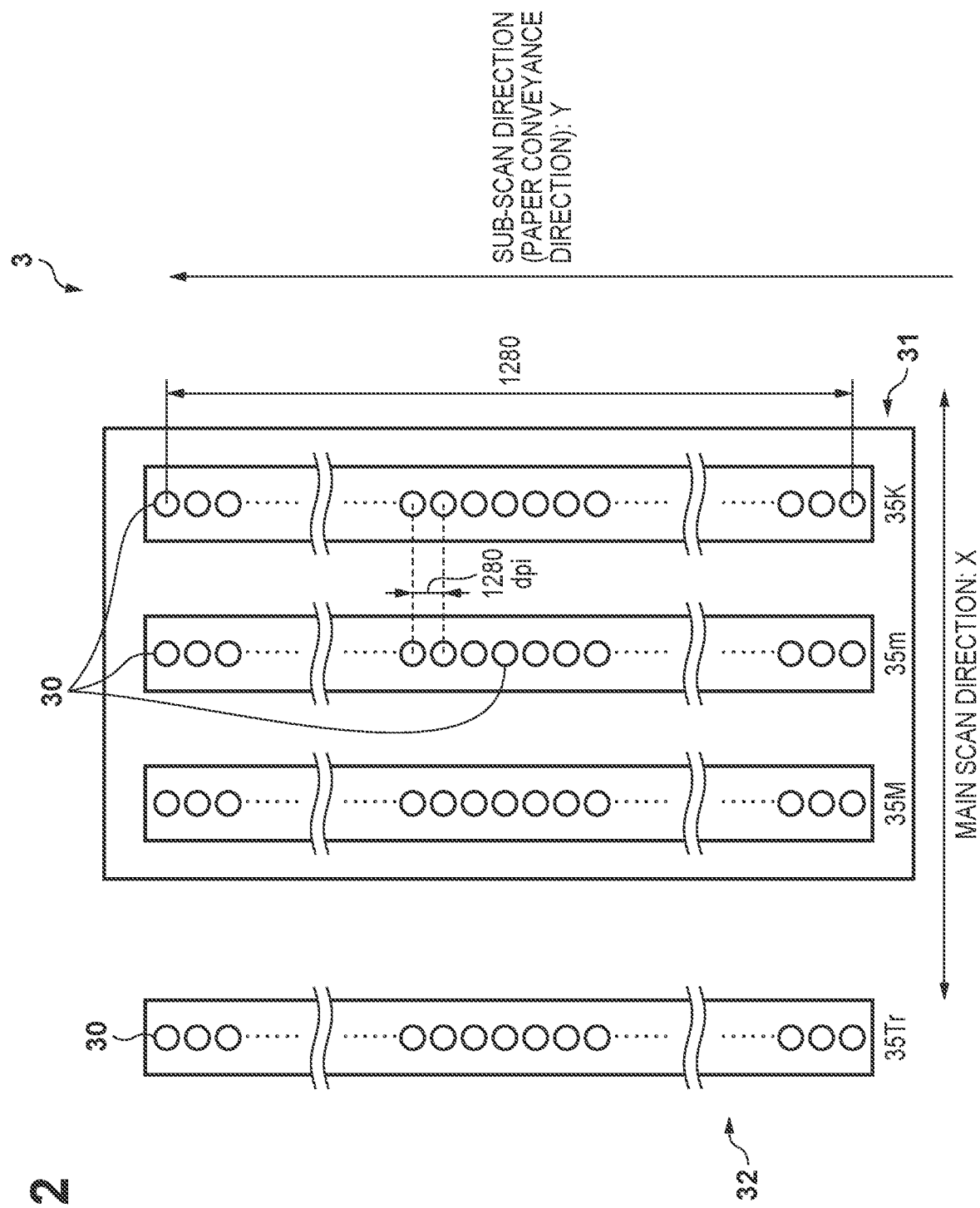
FIG. 2 is a schematic view of an ejection port formation surface of a printhead unit.

In the abovementioned related art, however, an airstream generated by air suction may contaminate the lower surface of a print medium, or effective suction may not be performed in a portion where no suction port is formed. In addition, the air suction mechanism may increase the size and cost of the apparatus.

Embodiments of the present invention provide a technique that effectively suppresses defective ejection of ink with a simple arrangement.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

Note that in this specification, "print" means not only the formation of significant information such as characters and figures, but also the formation of any information regardless of whether the information is significant or insignificant. "Print" also represents the formation of images, designs, patterns, and the like on a print medium and processing of the medium itself, regardless of whether they are actualized so as to be visually perceivable by a human.

In addition, "a print medium" represents not only paper used in a general print apparatus, but also any material capable of accepting ink, such as cloth, a plastic film, a metal plate, glass, ceramics, wood, and leather.

Furthermore, "ink" (to be also called "a liquid" hereinafter) should be interpreted widely like the abovementioned definition of "print". Accordingly, "ink" represents a liquid that can be used, when applied on a print medium, to form images, designs, patterns, and the like, to process the print medium, or to treat ink (for example, solidification or insolubilization of a colorant in the ink to be applied to a print medium).

Moreover, "an ejection port" generally represents an ejection port or a liquid path communicating with it unless otherwise specified. Also, a print element for generating energy that ejects ink as a drop is formed inside each ejection port, and an ejection port including this print element will be called "an ejection port" in some cases.

First Embodiment

Outline of Print Apparatus (Overall Configuration)

FIG. 1A shows the outer appearance of an inkjet print apparatus 100 (to be also called a print apparatus 100 hereinafter) according to an embodiment. FIG. 1B is a schematic view of a heating unit of the print apparatus 100. The print apparatus 100 is a so-called serial scan printer, and prints an image on a print medium P by scanning a printhead in the X direction (a scan direction) perpendicular to the Y direction (a conveyance direction) of the print medium P.

An outline of the print apparatus 100 will be explained with reference to FIGS. 1A and 1B. The print apparatus 100 includes a carriage unit 2, a printhead unit 3 attachable to the carriage unit 2, a platen 4, a spool 6, an encoder 7, a guide shaft 8, a conveyor roller 10, a pinch roller 11, a take-up roller 14, and a heating unit 20. The print apparatus 100 generally performs printing as follows.

First, the print medium P is conveyed in the Y direction from the spool 6 holding the print medium P, by a conveyor motor (not shown) and a conveyor roller driven via a gear connected to the conveyor motor. The print medium P conveyed from the spool 6 is further conveyed by the conveyor roller 10 and the pinch roller 11 urged against the conveyor roller 10, and guided to a print position (a scanning region of the printhead unit 3) on the platen 4.

After that, the carriage unit 2 scans (moves) the printhead unit 3 back and forth along the guide shaft 8 extending in the X direction by a carriage motor (not shown). During the course of this scan, the printhead unit 3 performs an ejecting operation at a timing based on a position signal obtained by the encoder 7, thereby printing an image on the print medium P by a predetermined band width corresponding to the array range of ejection ports 30 of the printhead unit 3. In this embodiment, when data of one scan is accumulated in a buffer, the carriage motor scans the carriage unit 2, thereby performing printing as described above. Note that the print apparatus 100 of this embodiment can perform so-called multipass printing by which an image is printed in a unit region (1/n band) on the print medium P by scanning the printhead unit 3 a plurality of times (n times). This multipass printing will be described in detail later.

Note that the scan rate is variable, for example, scan can be performed at a rate of 10 to 70 in./sec. In addition, the resolution of printing is also variable, for example, it can be 300 to 2,400 dpi (dot per inch: the number of ink dots per inch). The print medium P is conveyed after the scan described above, and printing is further performed in the next band width. This makes it possible to perform printing in the whole print range of the print medium.

Note also that a carriage belt or the like can be used to transmit the driving force from the carriage motor to the carriage unit 2. Instead of the carriage belt, however, it is also possible to use another driving system, such as a system including a lead screw that extends in the X direction and is rotated by the carriage motor, and an engaging portion arranged in the carriage unit 2 to engage with a groove of the lead screw.

Furthermore, the face surface of the printhead unit 3 is generally capped in a pause state. Therefore, the head unit 3 or the carriage unit 2 can be set in a scannable state by opening the cap before the print medium P reaches the print position.

The print medium P which has passed the print region of the printhead unit 3 and to which ink is applied is heated and dried by the heating unit 20. The heating unit 20 includes a heater 25 and a heater cover 26. The heater 25 supported by a frame (not shown) is installed in a position downstream in the Y direction (a sub-scan direction) of the position where the carriage unit 2 scans back and forth in the X direction (a main scan direction), and dries liquid ink on the print medium P with heat. The heater cover 26 covering the heater 25 has a function of efficiently emitting the heat of the heater 25 onto the print medium P, and a function of protecting the heater 25.

Practical examples of the heater 25 are a sheathed heater and a halogen heater. Note that the heating unit 20 can also be installed above the printhead unit 3 in the vertical direction, and can heat a print medium having a printed image from above. Note also that the heating unit 20 can be installed below the platen 4 in the vertical direction, and can heat a print medium having a printed image from below. Although not shown in FIG. 1B, the heating unit 20 can control the maximum temperature of a print medium by being used together with an infrared sensor or the like. For example, it is possible to form a controller for controlling the temperature of a print medium, and perform control that holds the heating temperature of the print medium constant.

In this embodiment, the heating unit 20 can also function as a unit that forms a film by heating water-soluble resin microparticles in the print medium P. The water-soluble resin microparticles are a resin for improving the scratch resistance of an image by forming a film when heated after being applied on a print medium. In this case, the heating temperature is desirably higher than the minimum film formation temperature of the resin microparticles, and it is necessary to evaporate most liquid components such as a water-soluble organic solvent in ink during heating. In the print medium conveyance direction, therefore, the heating unit 20 has a temperature distribution enough to secure a heating time for supplying energy required to evaporate most liquid components.

In this embodiment, the print apparatus 100 includes the take-up spool 14. The print medium P having passed the heating unit 20 after being printed by the printhead unit 3 is taken up by the take-up spool 14 and forms a roll-like taken-up medium.

(Configuration of Printhead)

Figure 3:
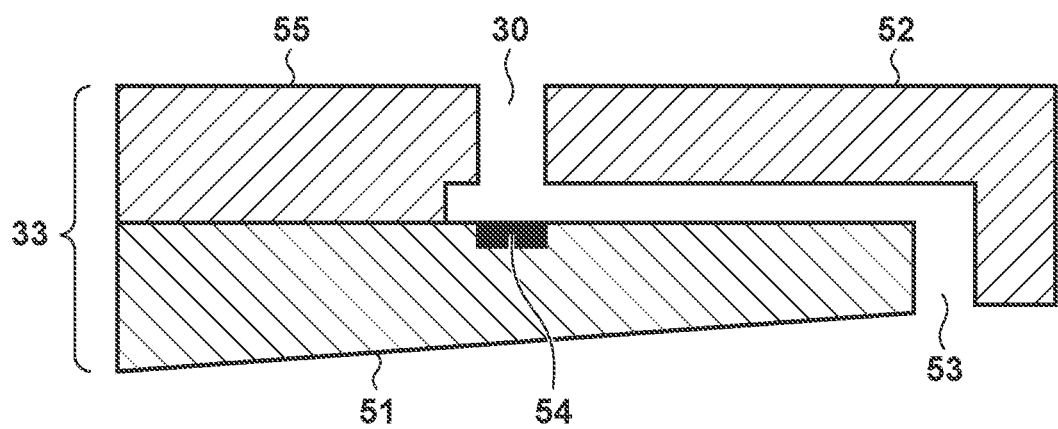
FIG. 3 is a schematic view showing the section of the ejection port formation surface of the printhead unit shown in FIG. 2.

FIG. 2 is a schematic view of an ejection port formation surface of the printhead unit 3. FIG. 3 is a schematic view showing the section of the ejection port formation surface of the printhead unit 3 shown in FIG. 2. The printhead unit 3 of this embodiment includes two printheads 31 and 32. A chip of the printhead 31 includes an ejection port row 35K (an element row 35K) for ejecting black ink (K) as ink containing a coloring material, an ejection port row 35$m$ (an element row 35$m$) for ejecting photo magenta ink (m), and an ejection port row 35M (an element row 35M) for ejecting magenta ink (M). In this embodiment, each of the black ink, the photo magenta ink, and the magenta ink contains a pigment as a coloring material. The photo magenta ink is ink having the same hue as that of the magenta ink and a coloring material concentration lower than that of the magenta ink. The hue of the black ink is different from that of the magenta ink. These inks will also be called pigment inks hereinafter. A chip of the printhead 32 has an ejection port row 35Tr (a reactive liquid element row) for ejecting a treatment liquid (Tr) containing neither a coloring material nor water-soluble resin microparticles. In this embodiment, these ejection port rows are arranged in the order of the ejection port rows 35Tr, 35M, 35$m$, and 35K from the left side to the right side in the X direction. More specifically, they are arranged such that the distance between the ejection port rows 35Tr and 35M is larger than that between the ejection port rows 35M and 35$m$. Since the ejection port row 35Tr of the treatment liquid is positioned relatively far away, the influence of adhesion of treatment liquid mist (to be described later) is suppressed. Similarly, the ejection port rows are so arranged that the distance between the ejection port rows 35Tr and 35M is larger than that between the ejection port rows 35$m$ and 35K.

This embodiment adopts an arrangement in which the ejection port rows 35M, 35$m$, and 35K are arranged close to each other in the same printhead 31, but the ejection port row 35Tr is formed in the other printhead 32, that is, positioned relatively away from the ejection port rows 35M, 35$m$, and 35K. This arrangement can suppress mixing of a treatment liquid other than treatment liquid mist to the color inks when the treatment liquid and the color inks are positioned close to each other by using the same cap. On the other hand, this arrangement is not always necessary from the viewpoint of preventing mixing of treatment liquid mist during printing as will be described later, so the ejection port rows 35M, 35$m$, 35K, and 35Tr may also be arranged in the same printhead.

Note that the distances between the ejection port rows are not limited to those explained above. For example, an arrangement in which the treatment liquid ejection port row 35Tr is positioned away from the other ejection port rows is generally adopted. Note also that each of the ejection port rows 35Tr, 35M, 35$m$, and 35K is formed by arraying 1,280 ejection ports 30 for ejecting the treatment liquid or ink at a density of 1,200 per inch in the Y direction (sub-scan direction).

The ejection port rows 35Tr, 35M, 35$m$, and 35K are connected to ink tanks (not shown) storing respective corresponding inks, and the inks are supplied therefrom. Note that the printheads 31 and 32 and the ink tanks can be either integrated or separated from each other. Alternatively, it is also possible to install the ink tanks in positions spaced apart from the printheads 31 and 32 of the print apparatus 100, and connect them by using tubes or the like. In this case, pumps for supplying the inks from the ink tanks to the printheads 31 and 32 can be installed.

Note that detailed compositions of the black ink, the photo magenta ink, the magenta ink, and the treatment liquid will be described later.

A temperature sensor installed on an ejection port formation substrate detects the temperature of each of the printheads 31 and 32 of the printhead unit 3. For example, this temperature sensor can be a sensor using the temperature dependence of the anode-to-cathode voltage of a diode.

The configuration of the ejection port 30 will be explained below with reference to FIG. 3. The printheads 31 and 32 of this embodiment are thermal inkjet type printheads. The thermal inkjet type printhead includes heating elements as print elements. Ink is heated on the heating element and ejected from the ejection port by using a film boiling phenomenon.

An upper plate member 55 is placed on a heating element formation substrate 51. An ejection port formation substrate 33 is formed by thus arranging the upper plate member 55 on the heating element formation substrate 51. A liquid passage 53 is formed between the heating element formation substrate 51 and the upper plate member 55. The liquid passage 53 communicates with the ejection port 30 formed in the upper plate member 55. A bubble release chamber is formed in the end portion of the ejection port 30 in the liquid passage 53. In this bubble release chamber, a heating element 54 is placed in a position facing the ejection port 30. In a print operation and a pre-eject operation, the heating element 54 is driven by a signal transmitted from a driving circuit 307 shown in FIG. 4, thereby generating heat from the heating element 54 and locally heating the liquid. Consequently, film boiling occurs in the liquid inside the bubble release chamber, and the generated pressure ejects a liquid droplet from the ejection port 30. As described above, the printheads 31 and 32 of this embodiment include the ejection port 30 and the heating element 54 formed in the passage communicating with the ejection port 30. Note that the amount of the droplet ejected from each ejection port is about 4 ng.

(Control Configuration)

Figure 4:
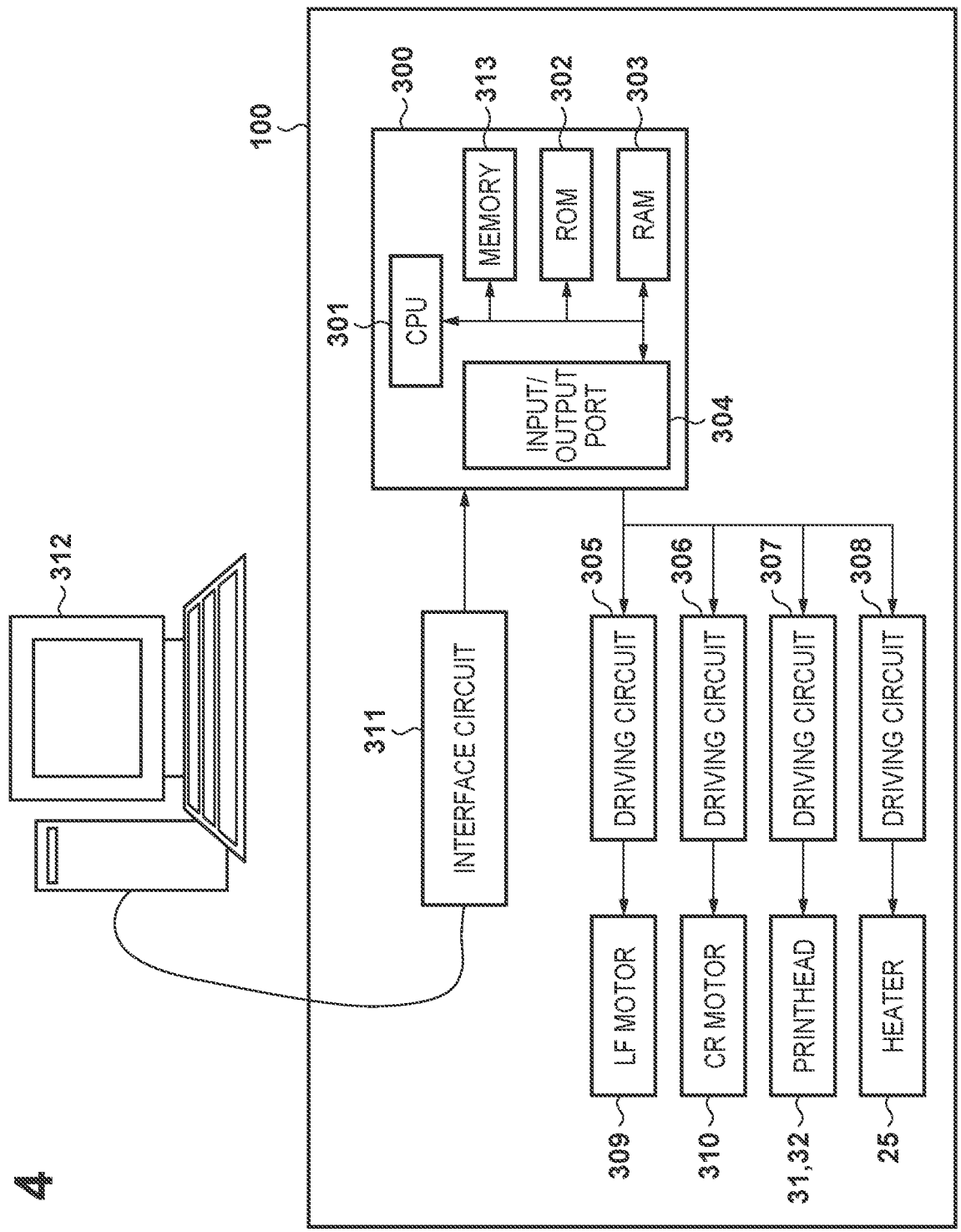
FIG. 4 is a block diagram showing an outline of the configuration of a control system of the print apparatus.

FIG. 4 is a block diagram showing an outline of the configuration of a control system of the print apparatus 100. A main control unit 300 includes a CPU 301, a ROM 302, a RAM 303, a memory 313, and an input/output port 304. The CPU 301 executes processing operations such as arithmetic operations, selection, discrimination, and control, and a print operation. The ROM 302 stores control programs and the like to be executed by the CPU 301. The RAM 303 is used as a print data buffer or the like. The memory 313 stores various kinds of information such as mask patterns. The input/output port 304 is connected to driving circuits 305, 306, 307, and 308 for driving a conveyor motor (LF motor) 309, a carriage motor (CR motor) 310, the printheads 31 and 32, and an actuator or the like in the heater 25. The main control unit 300 is connected to a PC 312 serving as a host computer via an interface circuit 311.

(Data Processing)

Figure 5:
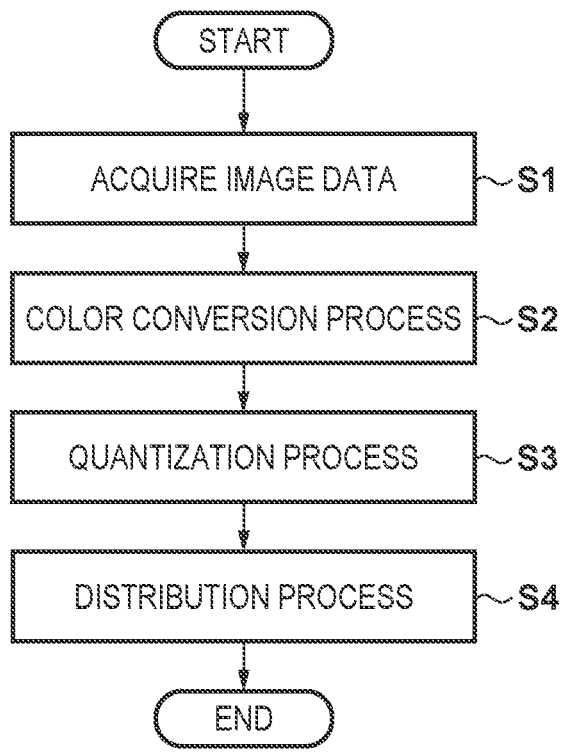
FIG. 5 is a flowchart of a print data generation process.

FIG. 5 is a flowchart of a print data generation process to be executed by the CPU 301. This flowchart is implemented by, for example, the CPU 301 by reading out a program stored in the ROM 302 to the RAM 303 and executing the program.

In step S1 (each step will simply be called S1 or the like hereinafter), the CPU 301 acquires image data (luminance data) represented by 8-bit, 256-value information (0 to 255) of each of red (R), green (G), and blue (B) input from the PC 312 as a host computer to the print apparatus 100.

In S2, the CPU 301 converts the image data represented by R, G, and B into multilevel data represented by a plurality of types of inks to be used to print the image data. This color conversion process generates multilevel data represented by 8-bit, 256-value information (0 to 255) that determines the gradation of ink in a pixel group including a plurality of pixels. In addition, the CPU 301 of this embodiment acquires the print duty of each color ink with respect to the multilevel data (gradation) that determines the generated gradation, by using color conversion tables as shown in FIGS. 8A to 8C (to be described later). In this case, the print duty indicates the ratio of the number of pixels to which application of ink is permitted, to the number of pixels in a predetermined region of a print medium. For example, when application of ink is permitted to all pixels in a predetermined region of a print medium, the print duty is 100% (so-called solid printing). As another example, when application of ink is permitted to half of all pixels in a predetermined region of a print medium, the print duty is 50%.

In S3, the CPU 301 executes quantization of the above-described multilevel data, thereby generating quantized data (binary data) represented by 1-bit binary information (0, 1) that determines ejection or non-ejection of each ink to each pixel. In this step, the process can be performed in accordance with various quantization methods such as the error diffusion method, the dither method, and the index method. More specifically, the CPU 301 generates quantized data based on the multilevel data acquired in S2 and the value of the print duty of each ink.

In S4, the CPU 301 performs a distribution process of distributing the quantized data to a plurality of times of scan of the printhead unit 3 with respect to a unit region. This distribution process generates print data represented by 1-bit binary information (0, 1) that determines ejection or non-ejection of each ink to each pixel in each of the plurality of times of scan to the unit region of the print medium. This distribution process is executed by using mask patterns that correspond to the plurality of scans and determine permission or non-permission of ejection of ink to each pixel (see FIG. 6).

The printhead ejects ink in accordance with the print data generated as described above.

Note that the form in which the CPU 301 of the print apparatus 100 executes all the processes in S1 to S4 has been described, but another form is also possible. An example is a form in which the PC 312 executes all the processes in S1 to S4. Another example is a form in which the PC 312 executes some processes and the print apparatus 100 executes the rest.

(Multipass Printing Process)

An image printing method to be performed by a so-called multipass printing process using the above-described treatment liquid (Tr), magenta ink (M), photo magenta ink (m), and black ink (K) will be explained below. Note that for the sake of simplicity, it is assumed that printing is performed in S4 by using the same mask patterns (see FIG. 6) for each ink. Note that printing is completed by performing scan four times in a unit region in this embodiment, but it is possible to appropriately set the number of scans in a unit region. Note also that in the following explanation, performing printing scan n times in a unit region will be called n-pass printing scan (for example, 4-pass printing scan).

Figure 6:
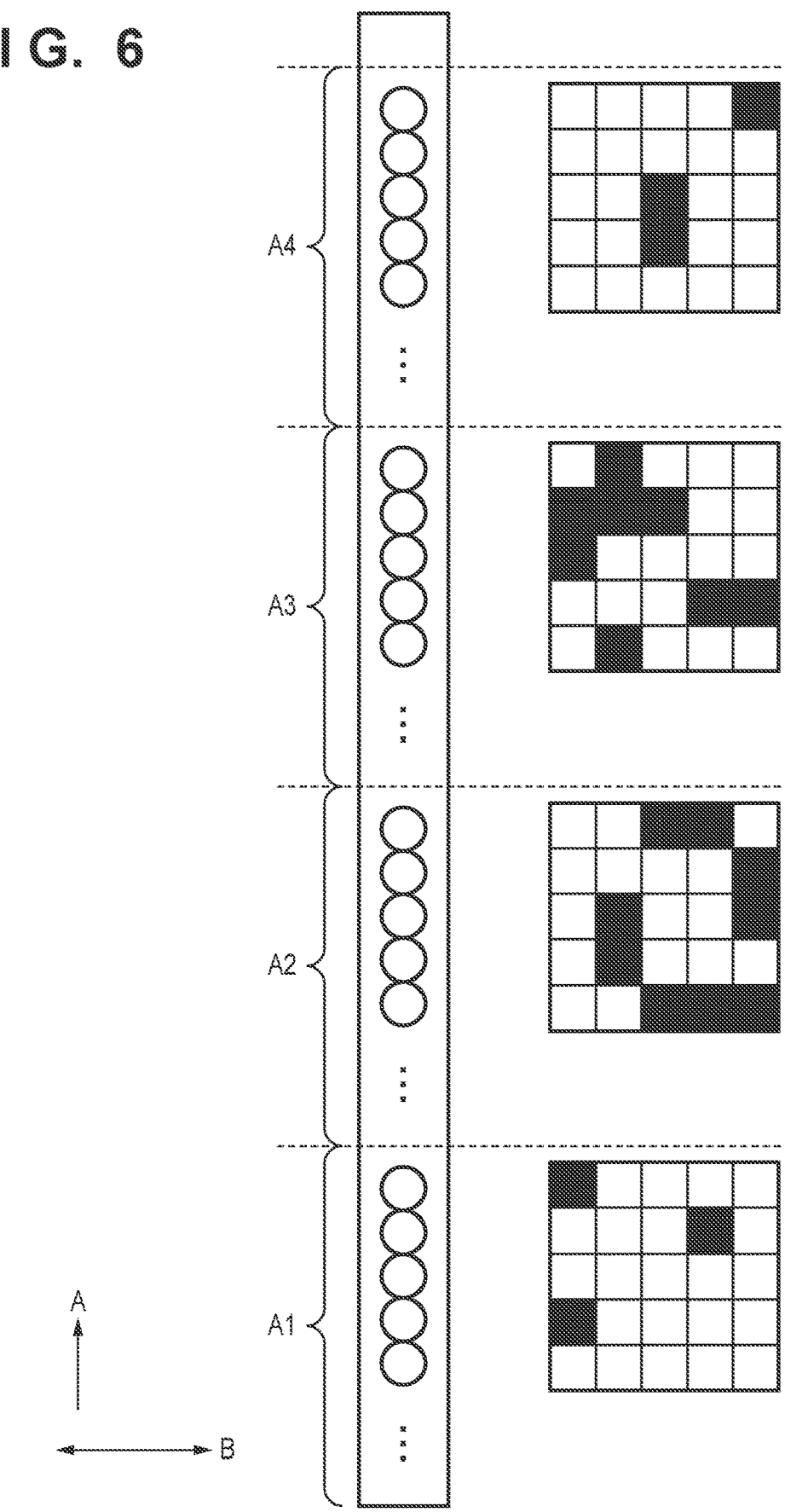
FIG. 6 is a schematic view showing mask patterns in a multipass print method.
Figure 7:
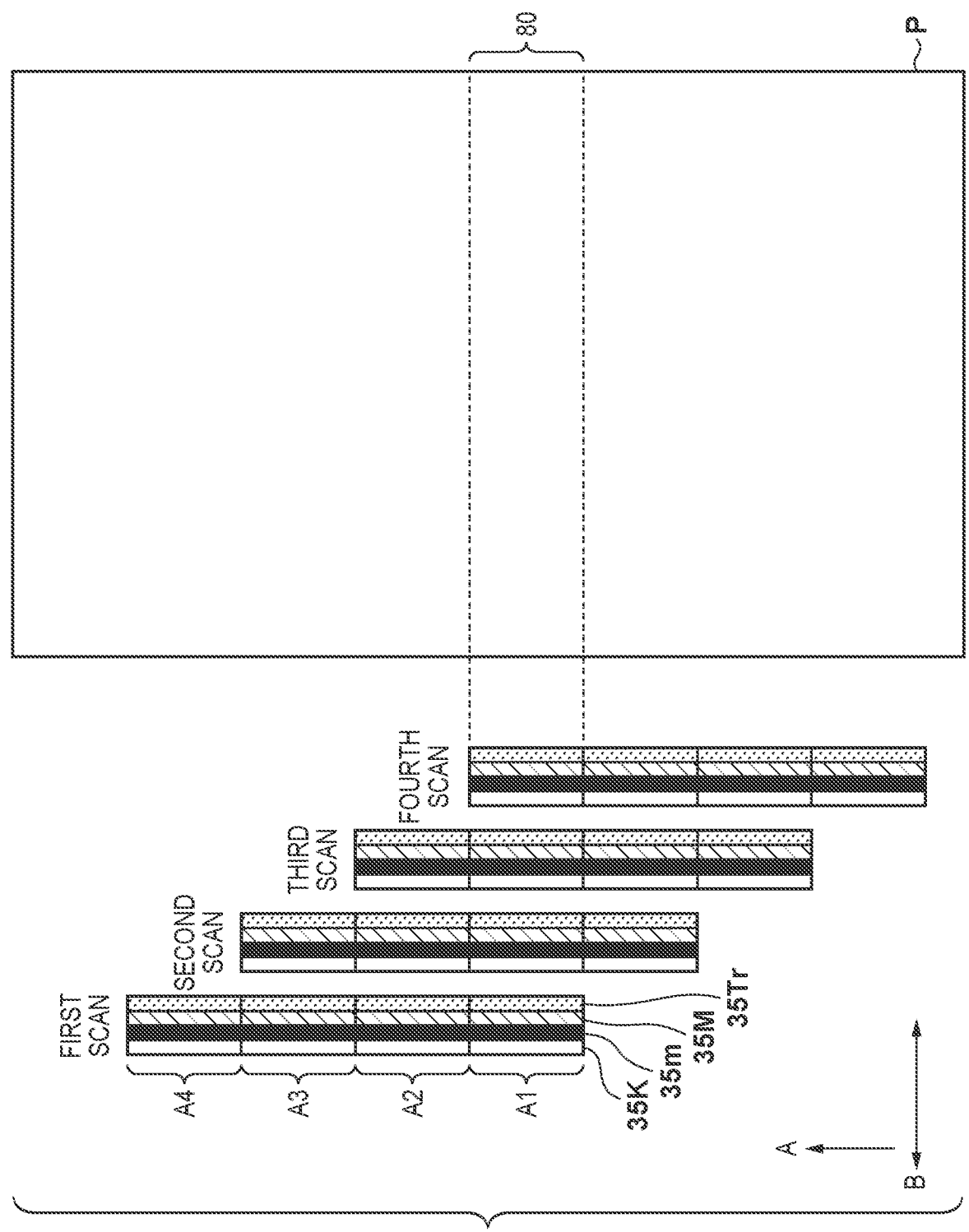
FIG. 7 is a view for explaining the multipass print method.

FIG. 6 is a schematic view showing examples of mask patterns to be used in the multipass printing process. FIG. 7 is a view for explaining the multipass printing process. In this embodiment, four ejection port groups A1 to A4 obtained by dividing each ejection port row 35 in a direction A shown in FIG. 6 eject ink in each of four times of scan in a unit region. Note that in practice, a print medium is conveyed to the downstream side in the direction A between scans of the printhead unit 3 (to be described later). For the sake of explanation, however, FIG. 6 shows that the printhead unit 3 is moved to the upstream side in the direction A between scans of the printhead unit 3.

First, in scan for the first time (the first scan), the printhead unit 3 is scanned in a positional relationship in which a unit region 80 on the print medium P and the ejection port group A1 of the ejection port row 35 oppose each other, and the ejection port group A1 ejects ink to the unit region 80 in accordance with the print data generated in S4 and corresponding to each type of ink corresponding to the first scan. After the first scan is complete, the print medium is conveyed in the Y direction (conveyance direction) by a distance corresponding to one ejection port group. After that, scan for the second time (the second scan) is performed, and the ejection port group A2 ejects ink to the unit region 80. After that, the conveyance of the print medium P and the ejection of the printhead unit 3 are alternately performed, and the ejection port groups A3 and A4 execute ejection in the third and fourth scans to the unit region 80. In this manner, multipass printing for the unit region 80 is complete.

In the mask patterns shown in FIG. 6, each black pixel indicates a pixel (to be also referred to as a print-permitted pixel hereinafter) to which ink ejection is permitted if ink ejection is determined by the quantized data. Each white pixel indicates a pixel (to be also referred to as a non-print-permitted pixel hereinafter) to which ink ejection is not permitted even when ink ejection is determined by the quantized data. FIG. 6 shows mask patterns each having a size of 5 pixels×5 pixels, and the distribution process is performed for all the quantized data corresponding to individual unit regions by repetitively applying these mask patterns in the direction A and a direction B.

The number of pixels existing in each of the four mask patterns shown in FIG. 6 is 5 pixels×5 pixels=25 pixels. The ratio of pixels to which ejection is permitted in the four 5 pixels=5 pixels mask patterns is the print permissible rate. Print data for applying ink in each printing scan can be generated by performing logical product (AND) processing between a part (a size of 5 pixels×5 pixels) of the binary data of each ink and a mask pattern corresponding to each printing scan (each pass).

Of the mask patterns respectively corresponding to the individual scans, three print-permitted pixels are arranged in the mask pattern corresponding to the first scan (the ejection port group A1). Accordingly, the print permissible rate of the mask pattern corresponding to the first scan is about 12% (=3/25×100). Likewise, the print permissible rates of the mask patterns corresponding to the second scan (the ejection port group A2), the third scan (the ejection port group A3 ), and the fourth scan (the ejection port group A4) are respectively, 36%, 32%, and 12%. When using these mask patterns, distribution is so performed that the printhead unit 3 ejects ink over the entire ejection port row. Note that each pattern shown in FIG. 6 is obtained by extracting a part of the mask pattern for the sake of simplicity, so there is a slight difference from the abovementioned print permissible rate in some cases.

Print Medium and Ink

Next, the properties of the print medium and the ink to be used in the print apparatus 100 will be explained.
(Permeability of Print Medium)

In this embodiment, the print apparatus 100 can print an image on an impermeable print medium as a print medium into which water-soluble ink does not permeate, or on a low-permeability print medium as a print medium into which water-soluble ink hardly permeates. A print medium for which an ink transfer amount obtained by the Bristow procedure shows a value smaller than 20 ml/m$^2$ will be called a low-permeability print medium. Also, a print medium for which the ink transfer amount shows a value smaller than that described above and is generally difficult to measure will be called an impermeable print medium.

The Bristow procedure as a method of evaluating the permeability of ink with respect to a print medium is described in JAPAN TAPPI Paper Pulp Test Method No. 51, "Test Method for Liquid Absorbency of Paper and Paperboard". A detailed explanation thereof will be omitted because the method is explained in many commercially available books, and an outline is as follows.

A predetermined amount of ink is injected into a holding vessel having an opening slit with a predetermined size, and brought into contact with a print medium formed into a strip and wound on a circular disk. While the position of the holding vessel is fixed, the circular disk is rotated and the area (length) of an ink belt transferred to the print medium is measured.

A transfer amount (ml/m$^2$) per unit area can be calculated from the area of the ink belt, and this transfer amount (ml/m$^2$) indicates an ink volume having permeated the print medium for a predetermined time. The predetermined time is defined as a transfer time. The transfer time (millisecond$^{1/2}$) is equivalent to the time of contact between the slit and the print medium, and converted from the speed of the disk and the width of the opening slit.

When the transfer amount of aqueous ink was measured for general printing coated paper by using the Bristow procedure, the transfer amount for a transfer time of 1 sec was smaller than 20 ml/m$^2$. Especially when using a low-permeability print medium such as coated paper, a value smaller than 10 ml/m$^2$ was obtained. When using the treatment liquid of this embodiment for a low-permeability print medium like this printing coated paper, more favorable image formation can be performed when compared to a case in which the treatment liquid is not used. Many inkjet paper sheets show transfer amounts of 30 ml/m$^2$ or more when using the Bristow procedure, but some of them have transfer amounts smaller than 20 ml/m$^2$. A print medium like this can be regarded as a low-permeability print medium although the medium is inkjet paper. That is, an effect can be obtained by applying the feature of this embodiment (to be described later) to not only printing coated paper, but also a general print medium as long as the medium is a low-permeability print medium.

Practical examples of the impermeable print medium are glass, plastic, and a film, that is, products not manufactured as print media for aqueous inkjet ink. An example is a product for which no surface treatment for aqueous inkjet printing is performed, that is, on which no water-absorbing layer is formed, for example, a product obtained by coating a substrate such as a non-plastic film or paper with plastic. Examples of the plastic are polyvinyl chloride, polyethylene terephthalate, polycarbonate, polystyrene, polyurethane, polyethylene, and polypropylene.

A PVC sheet into which aqueous ink does not permeate compared to inkjet paper will be explained below. A PVC sheet is a soft sheet manufactured by adding a plasticizer to a vinyl chloride resin as a main material, and is excellent in printing property and embossing property (formation of uneven patterns by embossing) in gravure printing, screen printing, and the like. Since various expressions are possible by combining them, they are used in many products such as tarpaulin, canvas, and wallpaper. Since a vinyl chloride resin is the main material, aqueous ink does not permeate and overflows on the sheet surface, so an image trouble and a drying trouble notably appear.

Practical examples of the low-permeability print medium are print media such as an actual printing stock for use in offset printing and the like, such as art paper and coated paper.

In this embodiment, the actual printing stock will be explained. The actual printing stock is formal (genuine) printing paper to be used in actual printing in offset printing when manufacturing products (goods). A paper sheet that is manufactured by using pulp as a material and used directly is non-coated paper, and a paper sheet having a surface smoothly coated with a white pigment is coated paper. In inkjet printing, an image trouble and a drying trouble caused by ink overflow appear noticeably on the coated paper. A coating layer is formed by applying about a few to 40 g/m$^2$ of a paint mixture of, for example, a sizing agent (for example, a synthetic resin) for limiting liquid absorbency in gaps between pulps and preventing bleeding of an aqueous pen, a filler (for example, kaolin) for improving, for example, the opacity, the whiteness, and the smoothness, and a paper strengthening agent (for example, starch). The average capillary diameter of the coated paper forms a normal distribution around about 0.06 μm, so a large number of capillaries permeate water (a capillary phenomenon). However, the pore volume of the coated paper is much smaller than that of the inkjet paper, so the aqueous ink permeability is low. Consequently, ink overflows on the paper surface, and an image trouble and a drying trouble appear conspicuously.

(Compositions of Inks and Treatment Liquid)

The compositions of the inks and the treatment liquid to be used in this embodiment will be explained below. In this embodiment, both the color inks (M, m, and K) as pigment inks containing a pigment as a coloring material and the treatment liquid (Tr) not containing a pigment but containing a component that reacts with a pigment contain a water-soluble organic solvent. In addition, they can also contain water-soluble resin microparticles (to be described in detail later), a reactive agent, a surfactant, and the like.

Water-Soluble Organic Solvent

The water-soluble organic solvent preferably has a boiling point of 150° C. (inclusive) to 300° C. (inclusive) for the reasons of the wettability and the moisture retaining property of the ejection port surface of the printhead unit 3. From the viewpoint of the function of a film formation assistant with respect to the resin microparticles, particularly favorable solvents are ketone-based compounds such as acetone and cyclohexane, propylene glycol derivatives such as tetraethylene glycol dimethyl ether, and heterocyclic compounds having a lactam structure such as N-methyl-pyrrolidone and 2-pyrrolidone. The content of the water-soluble organic solvent is preferably 3 wt % (inclusive) to 30 wt % (inclusive) from the viewpoint of the ejection performance. Practical examples of the water-soluble organic solvent are as follows. Alkyl alcohols having 1 to 4 carbon atoms such as methyl alcohol, ethyl alcohol, n-propyl alcohol, isopropyl alcohol, n-butyl alcohol, sec-butyl alcohol, and tert-butyl alcohol. Amides such as dimethylformamide and dimethylacetamide. Ketones and keto alcohols such as acetone and diacetone alcohol. Ethers such as tetrahydrofuran and dioxane. Polyalkylene glycols such as polyethylene glycol and polypropylene glycol. Ethylene glycol. Alkylene glycols in which an alkylene group contains 2 to 6 carbon atoms, such as propylene glycol, butylene glycol, triethylene glycol, 1,2,6-hexane triol, thiodiglycol, hexylene glycol, and diethylene glycol. Lower alkyl ether acetate such as polyethylene glycol monomethyl ether acetate. Glycerin. Lower alkyl ethers of polyalcohol such as ethylene glycol monomethyl (or ethyl) ether, diethylene glycol methyl (or ethyl) ether, and triethylene glycol monomethyl (or ethyl) ether. Polyalcohols such as trimethylol propane and trimethylol ethane. N-methyl-2-pyrrolidone, 2-pyrrolidone, and 1,3-dimethyl imidazolidinon. The water-soluble organic solvents as described above can be used singly or in the form of a mixture.

Water-Soluble Resin Microparticles

In this embodiment, the color inks (M, m, and K) containing a pigment contain water-soluble resin microparticles in order to bring the print medium P and a coloring material into tight contact with each other and improve the scratch resistance (fixation) of a printed image. Since the water-soluble resin microparticles melt with heat, film formation of the resin microparticles and drying of a solvent contained in ink are performed by a heater. In this embodiment, "water-soluble resin microparticles" mean polymer microparticles that exist in a state in which they are dispersed in water. Practical examples are as follows. Acrylic resin microparticles synthesized by emulsion polymerization of a monomer such as alkyl ester (meth)acrylate or alkyl amide (meth)acrylate. Styrene-acrylic resin microparticles synthesized by emulsion polymerization of monomers such as alkyl ester (meth)acrylate or alkyl amide (meth)acrylate and styrene. Polyethylene resin microparticles, polypropylene resin microparticles, polyurethane resin microparticles, and styrene-butadiene resin microparticles. It is also possible to use core-shell resin microparticles in which a core portion and a shell portion forming the resin microparticle have different polymer compositions, and resin microparticles obtained by performing emulsion polymerization around acryl-based microparticles, as seed particles, previously synthesized in order to control the particle size. Furthermore, it is possible to use hybrid resin microparticles obtained by chemically bonding different resin microparticles such as acrylic resin microparticles and urethane resin microparticles.

Also, "polymer microparticles that exist in a state in which they are dispersed in water" described above can be a form of resin microparticles obtained by homopolymerization of a monomer having a dissociable group or copolymerization of a plurality of types, that is, a so-called self-dispersing resin microparticle dispersion. Examples of the dissociable group are a carboxyl group, a sulfonic acid group, and a phosphoric acid group, and examples of a monomer having this dissociable group are acrylic acid and methacrylic acid. It is also possible to use a so-called emulsion-dispersing resin microparticle dispersion. As an emulsifier, it is possible to use a material having anionic electric charge regardless of whether the molecular weight is low or high.

The glass transition temperature (Tg) of the resin microparticles to be used in ink of this embodiment is preferably 40° C. (inclusive) to 120° (inclusive), and more preferably 50° C. (inclusive) to 110° C. (inclusive). If Tg is less than 40° C., the resin is soft, and it is sometimes impossible to sufficiently obtain the effect of improving the scratch resistance of an obtained image. If Tg is higher than 110° C., the minimum film formation temperature of the resin emulsion also rises, so the resin applied to a print medium hardly softens, and this may make the scratch resistance of an image insufficient. From these viewpoints, it is favorable to use resin emulsions using methyl(meth)acrylate, n-butyl(meth)acrylate, and 2-ethylhexyl(meth)acrylate because Tg of the resin microparticles can fall within the range of 40° C. (inclusive) to 120° C. (inclusive). When using the water-soluble resin microparticles as described above, even if an external force is applied to a printed image by a nail or the like, slipperiness is produced, so the dynamic friction coefficient can effectively be decreased. This water-soluble resin microparticle ink will also be referred to as a treatment liquid, coated ink, surface-coated ink, clear ink, an improving liquid, or resin emulsion ink. Tg will be described in detail later.

Also, it is desirable to use deionized water as water. The content (mass %) of water in ink is preferably 10.0 mass % (inclusive) to 90.0 mass % (inclusive), and more preferably 30.0 mass % (inclusive) to 80.0 mass % (inclusive), of the total mass of the ink. In addition, the content (mass %) of the water-soluble organic solvent in ink is preferably 3.0 mass % (inclusive) to 50.0 mass % (inclusive), and more preferably 3.0 mass % (inclusive) to 40.0 mass % (inclusive), of the total mass of the ink. In order to give desired physical property values as needed to the color inks and the water-soluble resin microparticle inks to be used in this embodiment, it is possible to appropriately add a surfactant, a pH adjuster, a corrosion inhibitor, an antiseptic agent, an anti-mold agent, an antioxidant, an anti-reduction agent, an evaporation accelerator, a chelating agent, and other resins, in addition to the abovementioned components.

Surfactant

The surface tension of each ink of this embodiment is 20 to 30 dyn/cm because a surfactant is used. This is so because if ink having a high surface tension is used for a low-permeability print medium/impermeable print medium such as an actual printing stock or a PVC sheet, the ink hardly spreads on the surface of the print medium, and a beading phenomenon occurs more notably. As the surfactant, it is favorable to use a fluorine-based or silicone-based surfactant. The fluorine-based or silicone-based surfactant can decrease the surface tension of ink even when the content is small, so the wettability of the ink to a print medium can be increased. Even when performing printing on an impermeable print medium, therefore, the image quality can be improved by suppressing a phenomenon in which ink is repelled on the print medium. Examples of the fluorine-based and silicone-based surfactants are Zonyl FSO, Zonyl FSO100, Zonyl FSN, and Zonyl FS100 (manufactured by Dupont); MEGAFACE F-410, MEGAFACE F-493, MEGAFACE F-443, MEGAFACE F-444, and MEGAFACE F-445 (manufactured by DIC); Novec FC-4430 and Novec FC-4432 (manufactured by 3M); FTERGENT 100, FTERGENT 150, FTERGENT 150CH, FTERGENT 250, FTERGENT 400SW, and FTERGENT 501 (manufactured by NEOS); KS508, KP360A, and KP360A (manufactured by Shin-Etsu Silicone); and FZ-2191, FZ-2123, and 8211 ADDITIVE (manufactured by Dow Corning Toray). As the addition amount of the surfactant increases, the property that decreases the surface tension of ink becomes strong, so the wettability and permeability of ink to a print medium improve. Accordingly, ink having a surface tension of 30 dyn/cm or less is favorable as ink to be used for a low-permeability print medium/an impermeable print medium. In addition, to equalize the ejection characteristics (the ejection amount, the ejection velocity, and the like) of the ejection port of the printhead for a plurality of types of inks, inks to be used preferably have surface tensions falling within a given range. In the printhead unit 3 of this embodiment, the surface tensions preferably fall within the range of ±3 dyn/cm. Note that the surface tension was measured by using, for example, Bubble Pressure Tensiometer Model: BP2 manufactured by KRUSS. Note also that a measurement device is not limited to this as long as the surface tension of ink can be measured.

Furthermore, a nonionic surfactant can also be used. The nonionic surfactant can stably hold dispersion by the dispersion stabilizing effect of an EO chain even when a component (for example, a polyvalent metal or an acid) that reacts with a pigment dispersion is contained. Practical examples are polyoxyethylene alkyl ether, polyoxyethylene alkyl aryl ether, polyoxyethylene alkyl phenyl ether, polyoxyethylene glycol ester, polyoxyethylene fatty acid amide, polyoxyethylene fatty acid ester, polyoxyethylene polyoxypropylene glycol, glycerin ester, sorbitan ester, sucrose ester, polyoxyethylene ether of glycerin ester, polyoxyethylene ether of sorbitan ester, polyoxyethylene ether of sorbitol ester, fatty acid alkanol amide, amine oxide, polyoxyethylene alkylamine, glycerin fatty acid ester, sorbitan fatty acid ester, polyoxyethylene sorbitan fatty acid ester, polyoxyethylene sorbitol fatty acid ester, and alkyl(poly)glycoxide.

Coloring Materials

In this embodiment, an anionic coloring material is used in each ink except for the treatment liquid. Therefore, the pH of each ink is stable on the alkali side, and the value of the pH is 8.5 to 9.5. The pH of ink is generally preferably 7.0 (inclusive) to 10.0 (inclusive) from the viewpoint of preventing, for example, impurity elution from a member in contact with the ink, deterioration of a material forming a member, and a decrease in solubility of a pigment dispersion resin contained in the ink. Examples of a pH adjuster are organic amines such as diethanolamine and triethanolamine, hydroxides of alkaline metals such as sodium hydroxide, lithium hydroxide, and potassium hydroxide, organic acids, and inorganic acids. The pH can be measured by using, for example, pH METER Model F-52 manufactured by HORIBA, but a measurement device is not limited as long as the device can measure the pH of ink.

Treatment Liquid

In this embodiment, a treatment liquid (RCT) is used for the purpose of forming an image on a low-permeability or impermeable print medium. The treatment liquid to be used in this embodiment contains a reactive component that reacts with a pigment contained in ink and aggregates or gelates the pigment. More specifically, this reactive component is a component capable of destroying the dispersion stability of ink containing a pigment stably dispersed or dissolved in an aqueous medium by the action of an ionic group, when the component is mixed with the ink on a print medium or the like. Since an anionic coloring material is used in this embodiment, reactants can roughly be classified into acidic reactants, polyvalent metal-based reactants, and cationic polymer-based reactants. In the following description, the treatment liquid will also be called a reactive liquid.

The acidic reactants can roughly be classified into inorganic acids and organic acids. Organic acids will be explained in this embodiment, but the acidic reactants are not limited to organic acids. Practical examples of the organic acids are oxalic acid, polyacrylic acid, formic acid, acetic acid, propionic acid, glycolic acid, malonic acid, malic acid, maleic acid, ascorbic acid, levulinic acid, succinic acid, glutaric acid, glutamic acid, fumaric acid, citric acid, tartaric acid, lactic acid, pyrrolidone carboxylic acid, pyrone carboxylic acid, pyrrole carboxylic acid, furane carboxylic acid, pyridine carboxylic acid, coumaric acid, thiophene carboxylic acid, nicotinic acid, oxy succinic acid, and dioxy succinic acid. Of the total mass of compositions contained in the treatment liquid as a reference, the content of the organic acid is preferably 3.0 mass % (inclusive) to 90.0 mass % (inclusive), and more preferably 5.0 mass % (inclusive) to 70.0 mass % (inclusive).

Favorable examples of a polyvalent metal-based reactant are divalent metal ions such as $Ca^{2+}$, $CU^{2+}$, $Ni^{2+}$, $Mg^{2+}$, $Zn^{2+}$, $Sr^{2+}$, and $Ba^{2+}$, and trivalent metal ions such as $Al^{3+}$, $Fe^{3+}$, $Cr^{3+}$, and $Y^{3+}$. However, the present invention is not limited to these examples. These polyvalent metal ions can be contained in the treatment liquid by using salt of a polyvalent metal. "Salt" means metal salt formed by the polyvalent metal ions as described above, and anions that bond to these ions. This salt must be soluble in water. Favorable examples of anions for forming salt are $Cl^-$, $NO^{3-}$, $I^-$, $Br^-$, $ClO_3^-$, $SO_4^{2-}$, $CO_3^{2-}$, $CH_3COO^-$, and $HCOO^-$, but the present invention is not limited to them.

In this embodiment, the polyvalent metal ion is more preferably $Ca^{2+}$, $Mg^{2+}$, $Sr^{2+}$, $Al^{3+}$, or $Y^{3+}$, and most preferably $Ca^{2+}$, from the viewpoints of the reactivity, the colorability, and the ease of handling. Also, the anion for forming the salt together with the polyvalent metal ion is particularly preferably methane sulfonic acid, from the viewpoint of the safety and the like.

The cationic polymer-based reactant is preferably soluble in water. Practical examples of a cationic polymer are polyarylamine hydrochloride, polyamine sulfonate, polyvinylamine hydrochloride, and chitosan acetate. Other examples are a copolymer of vinylpyrrolidone obtained by cationizing a part of a nonionic polymer substance and aminoalkylalkylate quaternary salt, and a copolymer of acrylamide and aminomethyl acrylamide quaternary salt. A treatment liquid containing the cationic polymer as a reactive component is preferably colorless, but is not necessarily a liquid showing no absorption in the visible range. That is, the treatment liquid can also have a light color and exhibit absorption in the visible range as long as the liquid has practically no influence on a formed image.

Adhesion of Treatment Liquid Mist to Ejection Port

One feature of the inkjet print method is that an ink ejection port is small. Since this makes an ink droplet that is landed on a print medium smaller, fine image printing is possible. On the other hand, since the ejection port is small, defective ejection of ink can easily occur for the reason to be explained below.

First, an ejection frequency, that is, a frequency at which a print element is driven increases. The volume of ink ejected from the small ejection port is small, and the amount of ink to be applied to a print medium per unit time decreases if the ejection frequency is low. On the other hand, the amount of mist generally increases when the ejection frequency is raised. When the amount of mist of the treatment liquid increases, the possibility that the mist adheres to the vicinity of the color ink ejection port increases. That is, raising the ejection frequency can increase defective ejection of color ink. Note that the ejection frequency can be decreased by decreasing the scan rate of the carriage, but this poses the problem that the productivity of printed products decreases.

In addition, it is known that when the ejection frequency is raised, an airflow generated between ejection port rows becomes larger. When the ejection frequency of the color ink ejection port row is raised, an airflow curling up around the ejection port row of color ink becomes larger, and this increases the curl-up amount of treatment liquid mist. As a consequence, defective ejection of color ink may occur.

From the foregoing, the occurrence frequency of defective ejection of color ink caused by treatment liquid mist when using the treatment liquid can be explained by using the relationship between the physical properties of ink typified by the mixing viscosity of the treatment liquid and the color ink, and an airflow generated between the head and the print medium. These two points will be described in detail below.

(Ink Physical Properties)

In this embodiment, the treatment liquid comes in contact with ink and decreases the fluidity of the ink and/or some ink compositions on a print medium. This can suppress bleeding and beading by the ink during image formation. More specifically, a reactant (to be also referred to as an ink viscosity increasing component) contained in the treatment liquid comes in contact with, for example, a coloring material and a resin as components forming ink and chemically reacts with them or physically adsorbs them. This makes it possible to raise the viscosity of the whole ink or locally raise the viscosity by aggregating components such as the coloring material forming the ink, thereby decreasing the fluidity of the ink and/or some ink compositions.

As described earlier, the treatment liquid is necessary to form an image on an impermeable medium while holding a high productivity. However, if a small amount of mist of the treatment liquid and color ink mix with each other in the color ink ejection port, defective ejection occurs in the nozzle of the color ink. This is so because when the treatment liquid and the color ink mix with each other, the dispersion of a pigment contained in the color ink is destroyed, and this raises the viscosity of the color ink in the color ink ejection port.

From the foregoing, a behavior occurring when mixing the color ink and the treatment liquid is focused as the ink physical property. The mixing viscosity was measured as a method of evaluating the reaction behavior of ink during mixing.

Before being mixed with the treatment liquid, the viscosity of the color ink to be used in this embodiment is preferably 1 to 20 mPa·s. If the ink viscosity is smaller than 1 mPa·s, it is difficult to form an ink image on an impermeable print medium, so image deterioration occurs. On the other hand, if the ink viscosity is larger than 20 mPa·s, ink ejection becomes difficult, and the ejection reliability decreases. The ink viscosity is further preferably 2 to 10 mPa·s. Note that the ink viscosity is a value measured at 25° C. by a viscometer ("RE-80 Type Viscometer" manufactured by TOKI SANGYO). Note that a measurement device is not limited to the above example as long as the device can measure the ink viscosity. A method of measuring the mixing viscosity of the treatment liquid and the color ink by using the abovementioned viscometer will be explained below. The viscometer used in this embodiment is generally called a cone plate type viscometer. First, the color ink is applied to a cup so that the ink wets the whole cup while spreading. After that, a reactive liquid is applied to the center of the cup, the cup is immediately covered with a plate, and viscosity measurement is started. The measurement was performed for 1 min by setting the measurement temperature at 25° C. and the rotational speed at 5 rpm. From this result, reactivity evaluation was performed as evaluation of the viscosity rising behavior by measuring the viscosity when 1 min elapsed and 10 min elapsed after the mixing. Details of the measurement method will be explained later.

(Airflow between Head and Print Medium)

An airflow (inter-paper airflow) between the printhead unit 3 and a print medium in the print apparatus 100 as a serial inkjet printer used in this embodiment will be explained below.

Examples of the inter-paper airflow in the print apparatus 100 are an airflow (inlet airflow) generated when the printhead unit 3 moves, and an airflow (self-airflow) generated by ejection of an ink droplet from each ejection port 30. The inlet airflow is the flow of air generated between the printhead unit 3 and a print medium in the X direction (main scan direction). The self-airflow is the flow of air that goes from the printhead unit 3 to a print medium, collides against the print medium, and returns to the printhead unit 3 by inverting the direction of movement. In addition, after the self-airflow collides against the print medium, the airflow moving toward the printhead overlaps the inlet airflow, thereby generating a curling-up eddy (eddy current). It is generally known that when this eddy current catches floating mist (very small ink droplets in the atmosphere, also simply called mist) drifting in the print apparatus, the floating mist rides on the flow of the eddy current and adheres to the ejection port surface of the printhead unit 3.

It is known that this self-airflow becomes larger when the ejection frequency of the ink droplets increases. It is also generally known that the eddy current becomes larger when the self-airflow and the inlet airflow become larger. Therefore, to reduce the mist amount adhering to the face surface, it is important to reduce the amount of mist to be generated and make the self-airflow and the inlet airflow smaller.

It is, however, not always possible to simply reduce the generated mist amount because it is necessary to, for example, change the head ejection port design, and change the material to be used in ink. Also, decreasing the ejection velocity or the ejection frequency is probably effective to make the self-airflow smaller. However, decreasing the ejection velocity may lead to the difficulty in elimination of ejection port clogging by evaporated ink. Also, decreasing the ejection frequency may lead to a decrease in productivity as described above, or to deterioration of the quality of a product such as a decrease in color development. Accordingly, it is necessary to reduce the eddy current and maintain the productivity and the image quality at the same time.

(Positional Relationship between Treatment Liquid Ejection Port and Color Ink Ejection Port)

The relative positions of the ejection port and the adhesive mist also have influence on whether the treatment liquid mist is curled up by the eddy current and causes defective ejection by adhering to the ejection port surface. The explanation will be made by taking the positional relationship between the ejection ports shown in FIG. 2 as an example. In the following explanation, magenta ink (M) and photo magenta ink (m) having similar colors shown in FIG. 2 are respectively regarded as thick ink and thin ink.

When the thick ink (magenta ink (M)) is ejected from the ejection port row 35M closest to the ejection port row 35Tr for ejecting the treatment liquid, the treatment liquid mist adheres between the ejection port row 35M of the thick ink and the ejection port row 35Tr of the treatment liquid when the eddy current generation position is taken into consideration.

Note that when the mist adheres between the ejection port row 35M of the thick ink and the ejection port row 35Tr of the treatment liquid, the mist generally adheres to the vicinities of these ejection port rows. Although it depends on the state of the eddy current, the mist hardly adheres to each ejection port row itself, and mist adhesion by the eddy current often occurs within a range between the ejection port row and a position at a distance of about 5 mm from the ejection port row. Note that the above-described distance depends on, for example, the size of a droplet ejected by the ejection port row, the speed of a droplet ejected by the ejection port row, the distance between the ejection port row and a print medium, or the scan rate of the printhead. In this embodiment, evaluation was performed in a state in which the ejection port row 35M of the thick ink and the ejection port row 35Tr of the treatment liquid was spaced apart by at least 15 mm or more. Accordingly, evaluation was performed in a state in which no ejection port row was formed in a position where the treatment liquid mist adhered, and in a state in which the ejection port rows were spaced apart from each other to such an extent that defective ejection did not occur due to ejection from each ejection port row alone.

On the other hand, when the ejection port row 35m ejects the thin ink (photo magenta ink (m)), treatment liquid mist is generated near the ejection port row 35M in the scan direction (the left direction in FIG. 2) in which the treatment liquid is ejected relatively earlier than the color ink, when the position of the eddy current is taken into consideration. This is so because evaluation was performed in a case in which the ejection port row 35M of the thick ink and the ejection port row 35m of the thin ink were at a distance of 5 mm or less. This treatment liquid mist mixes in a port of the ejection port row 35M of the thick ink and destroys the dispersion of a pigment inside the ejection port, so the ejection port clogs and defective ejection occurs. A method of evaluating defective ejection of ink will be described below, and then a configuration example for suppressing defective ejection of the thick ink in this ejection port positional relationship will be explained.

Evaluation Method

Evaluation of Defective Ejection

The print apparatus 100 of this embodiment includes a configuration for suppressing defective ejection of the color ink ejection port row. A method of evaluating the occurrence frequency of defective ejection will be explained below.

First, five A0-size solid images (RGB =0, 0, 0 and RGB=255, 0, 128) are printed for each of the two types. After that, an A4-size solid image (each color ink 100% duty) is printed by a one-pass printing process. If there is an ejection port having caused defective ejection, a paper-white line in which no ink is applied is formed on this A4-size printed product. The number and thickness of these lines are visually evaluated. The evaluation criteria for defective ejection in this embodiment are as follows.

AA (no defective ejection)

. . . after solid printing, no lines can visually be confirmed.

A (a few defective ejection lines)

. . . after solid printing, a few thin lines can visually be confirmed.

B (many defective ejection lines)

. . . after solid printing, many thick lines can visually be confirmed.

C (most are defective ejection lines)

. . . after solid printing, most evaluation patterns are not printed.

Gradation Evaluation Method

In this method, control is so performed as to relatively reduce the ejection ratio of the thin ink with respect to that of the thick ink, but this control may abruptly vary the color in the gradation of the same hue. Therefore, a change in gradation was evaluated as follows.

An image in which the gradation was concentrically changed was printed, and whether concentric rings were generated by the abrupt color variation was evaluated. That is, whether concentric rings can visually be confirmed clearly was evaluated by the following criteria.

A (good gradation)

. . . no concentric rings can visually be confirmed with naked eyes at a distance of 30 cm.

B (gradation in allowable range)

. . . concentric rings can visually be confirmed at a distance of 30 cm.

C (bad gradation)

. . . thick concentric rings can visually be confirmed clearly at a distance of 30cm.

Mixing Viscosity Evaluation Method

An object of this embodiment is to suppress the occurrence of ejection port clogging caused by thickening resulting from the destruction of pigment dispersion, when treatment liquid mist mixes in the color ink ejection port. Accordingly, whether ejection port clogging easily occurs when ink mixes can be evaluated by measuring the mixing viscosity of the color ink and the treatment liquid. For example, defective ejection hardly occurs when the viscosity does not change after mixing of the treatment liquid, and the ejection port easily clogs when the viscosity instantly rises after mixing of the treatment liquid. Also, even when no thickening instantly occurs after mixing, thickening is sometimes found when the viscosity is measured after an elapse of 24 hrs. To compare these cases, whether the suppression of defective ejection is possible was evaluated by measuring the mixing viscosity by the following procedure by using the above-described viscometer.

First, 0.97 mL of the color ink were collected and applied to the cone side of the viscometer such that the color ink wetted the whole cone. Then, 0.13 mL of the treatment liquid were applied to the center of the cone. Immediately after that, the viscosity was measured at 5 rpm and 25° C. The measurement time was 1 min. The measurements were performed immediately after mixing and after an elapse of 10 min.

By comparing the measurement results obtained when 1 min and 10 min elapsed after mixing, whether thickening instantly or gently occurred or almost no reaction occurred was evaluated.

Note that when suppressing thickening of the mixing viscosity, the reactivity with the treatment liquid decreases. If the reactivity of thick ink is decreased, beading remarkably occurs when a high-duty print method is performed on an impermeable print medium. To suppress beading, it is necessary to limit the amount of ink to be applied on a print medium, but it is difficult to limit the application amount of thick ink to be used for the purpose of printing an image having high color development. In this embodiment, therefore, thickening suppression of the mixing viscosity is not performed for thick ink, and thickening suppression is performed using thin ink or colorless ink.

EXAMPLE 1

The present invention will further be explained below by taking examples and comparative examples.
(Ink Composition)

This example uses a treatment liquid that reacts with a pigment contained in color ink and accelerates aggregation of the pigment. Especially when printing an image on a print medium (for example, a resin sheet) into which a liquid does not permeate, the treatment liquid and the color ink mix with each other on the print medium, thereby promoting thickening by pigment aggregation and suppressing beading. In the following explanation, magenta ink and photo magenta ink containing a pigment will be described as the color ink.

In this example, the ejection port rows of the magenta ink and the photo magenta ink are arranged in the order of the magenta ink and the photo magenta ink from a position close to the ejection port row of the treatment liquid. Generally, the ejection frequency of thick ink tends to rise when forming an image in a high color range. Therefore, the ejection port row of the thick ink is positioned close to the treatment liquid because this color order is advantageous for curl-up by the eddy current. On the other hand, if the ejection port row of the thin ink is positioned close to the ejection port row of the treatment liquid unlike in this example, a large amount of mist of the treatment liquid adheres to the vicinity of the thin ink ejection port row when forming an image in a high color range in which the ejection frequency is high. As a consequence, defective ejection of the thin ink can noticeably occur. The magenta ink and the photo magenta ink are respectively described as the thick ink and the thin ink, but they are merely examples, and ink colors and the like are not limited to this.
(Magenta Ink)
(1) Making of Pigment Dispersion First, an AB block polymer having an acid value of 300 and a number-average molecular weight of 2,500 was made by a conventional method by using benzyl acrylate and methacrylic acid as materials, neutralized by an aqueous potassium hydroxide solution, and diluted with ion-exchanged water, thereby making an aqueous homogeneous 50-mass % polymer solution. 100 g of this polymer solution, 100 g of C.I. pigment red 122, and 300 g of ion-exchanged water were mixed, and the mixture was mechanically stirred for 0.5 hrs. Then, this mixture was treated by using a microfluidizer by passing the mixture through an interaction chamber five times at a liquid pressure of about 70 Mpa. Furthermore, the obtained dispersion was centrifugally separated (12,000 rpm, 20 min) to remove a non-dispersion containing coarse particles, thereby obtaining a magenta dispersion. The obtained magenta dispersion had a pigment concentration of 10 mass % and a dispersant concentration of 5 mass %.
(2) Making of Water-Soluble Resin Microparticle Dispersion First, the following three liquid additives were added as they were dropped little by little under stirring by a motor at 70° C. in a nitrogen atmosphere, and polymerized for 5 hrs. The liquid additives were a hydrophobic monomer containing 28.5 parts of methyl methacrylate, a mixed liquid containing a hydrophilic monomer containing 4.3 parts of sodium p-styrene sulfonate and 30 parts of water, and a mixed liquid containing a polymerization initiator containing 0.05 parts of potassium persulfate and 30 parts of water. The obtained solution mixture was used as a water-soluble resin microparticle dispersion.
(3) Making of Ink Ink was made by adding the following components to the abovementioned magenta dispersion at a predetermined concentration. A pigment concentration was adjusted by preparing 5-mass % pigment ink. Similarly, to give the obtained water-soluble resin microparticles a concentration of 10 mass in the ink, the following components were mixed, and dissolved and dispersed by sufficient stirring, and the dispersion was filtered under pressure through a microfilter (manufactured by FUJIFILM) having a pore size of 2.5 μm, thereby preparing magenta ink. Finally, the ink was adjusted to mainly have the following components.
(Magenta Ink Formula Example 1)

| | |
|---|---|
| Abovementioned magenta pigment | 5 parts |
| Abovementioned water-soluble resin microparticles | 10 parts |
| Zonyl FSO-100 (fluorosurfactant manufactured by DuPont) | 0.05 parts |
| 2-pyrrolidone | 20 parts |
| Acetylene glycol EO adduct (manufactured by Kawaken Fine Chemicals) | 0.5 parts |
| Ion-exchanged water | balance |

(Photo Magenta Ink Formula Example 1)

Photo magenta ink was adjusted by using the abovementioned magenta dispersion and water-soluble resin microparticle dispersion such that the mixing ratio of the water-soluble resin microparticles and the magenta pigment was equal to that of the magenta ink.

| | |
|---|---|
| Abovementioned magenta pigment | 0.5 parts |
| Abovementioned water-soluble resin microparticles | 1 part |
| Zonyl FSO-100 (fluorosurfactant manufactured by DuPont) | 0.05 parts |
| 2-pyrrolidone | 20 parts |
| Acetylene glycol EO adduct (manufactured by Kawaken Fine Chemicals) | 0.5 parts |
| Ion-exchanged water | balance |

(Treatment Liquid Formula Example 1)

A treatment liquid was made by using glutaric acid as an organic acid in the abovementioned reactive components. The treatment liquid was finally adjusted to mainly contain the following components.

| | |
|---|---|
| Glutaric acid | 3 parts |
| 2-pyrrolidone | 20 parts |
| Acetylene glycol EO adduct | 0.5 parts |
| Zonyl FSO-100 (fluorosurfactant manufactured by DuPont) | 0.05 parts |
| Ion-exchanged water | balance |

(Data Generation)

This example has a feature in data generation as well, so data generation will be described in detail below. In this example, a method of suppressing the generation of an eddy current in order to suppress the occurrence of defective ejection of thick ink caused by treatment liquid mist will be explained.

An eddy current is remarkably generated when an inlet airflow or a self-airflow is large, and causes defective ejection. Therefore, reducing the self-airflow is effective to suppress defective ejection. Extensive studies have been made to find that the influence of the self-airflow tends to increase at an ejection frequency exceeding 10 kHz. Furthermore, the influence of the self-airflow was confirmed even at 8 kHz.

That is, when the carriage velocity is high, defective ejection easily occurs even at the same print duty. For example, when performing scan at a carriage velocity of 60 ips (inch per sec), a resolution of 600 dpi, and a print duty of 100%, the ejection frequency is 36 kHz. In the multipass printing process, an image is printed in a unit region by performing scan a plurality of times, so the print duty of each scan has influence on the ejection frequency. If the print duty per scan exceeds 22.2%, the influence of the eddy current remarkably occurs. Also, when the carriage velocity is 30 ips, the influence of the eddy current becomes notable if the print duty per scan exceeds 44.4%. Therefore, it is necessary to take account of the relationship between the print duty of thin ink printable per scan and the occurrence of defective ejection.

In this embodiment, to suppress the maximum print duty per scan of the thin ink to 20% or less, color conversion process tables were switched in a color conversion process step shown in FIG. 5. More specifically, in the color conversion process step, the color conversion process tables were switched in accordance with the number of printing scans and the carriage moving velocity.

FIGS. 8A to 8C illustrate examples of the color conversion process tables. In each table, the abscissa expresses the gradation value of image data, and the ordinate expresses the print duty of each ink color as a function of the gradation value. The gradation value can be expressed in steps of 0 to 100, 0 to 255, or the like. Note that the print duty on the ordinate indicates the print duty of 1-pass printing scan. To uniformly distribute the ink ejection amount to each scan when performing, for example, 4-pass printing scan, the print duty per scan is ¼. Note that in the following explanation, the resolution is 600 dpi under each condition.

Table 1 shown in FIG. 8A is a color conversion process table as a comparative example. In this table, the print duty of the photo magenta ink is maximum around a halftone, and reduces toward a high-tone region. A maximum value D1 as the maximum print duty of the photo magenta ink in Table 1 is set at a value at which the maximum print duty per scan exceeds 40% at a carriage velocity of 30 ips in 4-pass printing scan. That is, if a color conversion process using Table 1 is performed under this condition, an eddy current may notably be generated.

On the other hand, in Table 2 shown in FIG. 8B, the maximum print duty of the photo magenta ink is decreased from that in Table 1. The maximum print duty is decreased to a maximum value D2 for the purpose of suppressing the occurrence frequency of defective ejection. The maximum value D2 as the maximum print duty of the photo magenta ink in Table 2 is set at a value at which the maximum print duty per scan is 40% or less at a carriage velocity of 30 ips in 4-pass printing scan. Also, the maximum value D2 is set at a value at which the maximum print duty per scan is 20% or more when printing scan is 60 ips.

In Table 3 shown in FIG. 8C, the maximum print duty (a maximum value D3) of the photo magenta ink is further decreased from that in Table 2. Also, in Table 3, the magenta ink is used from a gradation value (G2) lower than that in Table 2 (G1) accordingly. The maximum value D3 is set at a value at which the maximum print duty per scan is 20% or more at a carriage velocity of 60 ips in 4-pass printing scan, and the maximum print duty per scan is 20% or less in 8-pass printing scan.

Comparison of Tables 1 and 2 reveals that the gradation is given priority in Table 1 because the print duty of the thin ink is relatively high. On the other hand, in Table 2, the maximum print duty of the thin ink is relatively decreased to suppress the occurrence of defective ejection by an eddy current. Also, in Table 3, the print duty of the thin ink is further decreased from that in Table 2, but the gradation in a low-tone region is secured by using the thick ink from a lower gradation value.

Figure 9:
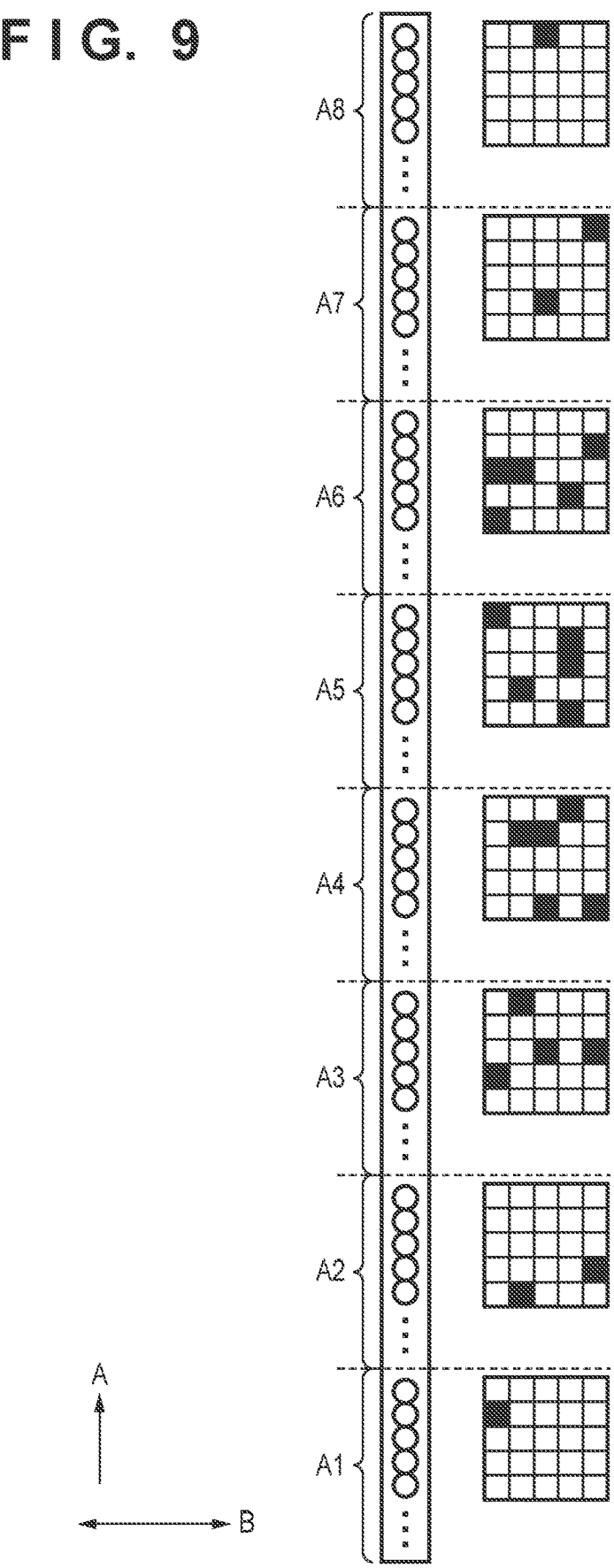
FIG. 9 is a schematic view showing mask patterns in 8-pass printing scan.

The evaluation results of this embodiment and comparative examples will be explained below. Comparative Example 1 is an example in which the maximum print duty per scan exceeds 40% at a carriage velocity of 30 ips in 4-pass printing scan, that is, is an example using Table 1. On the other hand, Example 1 is an example in which the maximum print duty per scan is 40% or less at a carriage velocity of 30 ips in 4-pass printing scan, that is, is an example using Table 2. Also, Comparative Example 2 and Example 2 are examples showing comparison between cases using Tables 2 and 3 at a carriage velocity of 60 ips in 4-pass printing scan. Furthermore, Example 3 is an example using Table 1 at a carriage velocity of 60 ips in 8-pass printing scan. Note that FIG. 9 shows the method of printing scan in these examples and comparative examples. Table 1 below summarizes the print conditions of these examples and comparative examples.

TABLE 1

| | Maximum print duty per scan | Carriage velocity | Number of printing scans | Table used |
|---|---|---|---|---|
| Comparative Example 1 | 40% duty or less | 30 ips | 4 pass | Table 1 |
| Example 1 | 40% duty or less | 30 ips | 4 pass | Table 2 |
| Comparative Example 2 | 20% duty or less | 60 ips | 4 pass | Table 2 |
| Example 2 | 20% duty or less | 60 ips | 4 pass | Table 3 |
| Example 3 | 20% duty or less | 60 ips | 8 pass | Table 1 |

(Evaluation Results)

The occurrence frequency of defective ejection and the gradation were evaluated. The evaluation was performed using the method described in <Evaluation Method>. A comparative example will be explained first. In Comparative Example 1, the maximum print duty per scan was high, and the ejection frequency of photo magenta increased in the halftone of a gradation image. Since this increased the occurrence frequency of defective ejection, the rank was C. In Examples 1 and 2, the ejection frequency of the photo magenta ink was decreased, so it was possible to decrease the occurrence frequency of defective ejection by suppressing an eddy current. Note that it was possible to decrease the occurrence frequency of defective ejection in Comparative Example 2 as well because the print duty of the photo magenta ink was decreased. On the other hand, the gradation decreased in Comparative Example 2. This is so because the increase in carriage velocity increased the limitation on the print duty of the thin ink, so the gradation was separated before the thick ink was used. By contrast, in Example 2, printing of the magenta ink started from a low-tone stage, so it was possible to secure the gradation. Also, in Example 3, the number of printing scans was large, so it was possible to decrease the print duty per scan more than those in other examples when using the same table. In Example 3, therefore, it was possible to obtain good results for both the occurrence frequency of defective ejection and the gradation by the use of Table 1 as a color conversion process table giving priority to the gradation. Table 2 below summarizes the above results.

TABLE 2

| | Frequency of defective ejection | Gradation |
| --- | --- | --- |
| Comparative Example 1 | C | AA |
| Example 1 | A | B |
| Comparative Example 2 | B | C |
| Example 2 | A | A |
| Example 3 | AA | AA |

Even when the number of printing scans is large, it is possible to improve the image quality and ensure the reliably at the same time by switching the color conversion process tables. For example, when performing printing scan a total of 8 times by using Tables 1 and 2 described above, Table 2 is more effective in decreasing the occurrence frequency of defective ejection, but Table 1 is superior in gradation. When performing printing scan a total of 8 times, therefore, switching not to Table 2 giving priority to the occurrence frequency of defective ejection but to Table 1 giving priority to the gradation is also beneficial. For example, when Table 1 is used at a carriage velocity of 30 ips in 4-pass printing scan, the maximum print duty per scan exceeds 40%. However, when the maximum print duty per scan is 40% or less in 8-pass printing scan, the use of Table 1 can suppress defective ejection while holding good gradation.

(Method of Selecting Color Conversion Process Table)

Figure 10A:
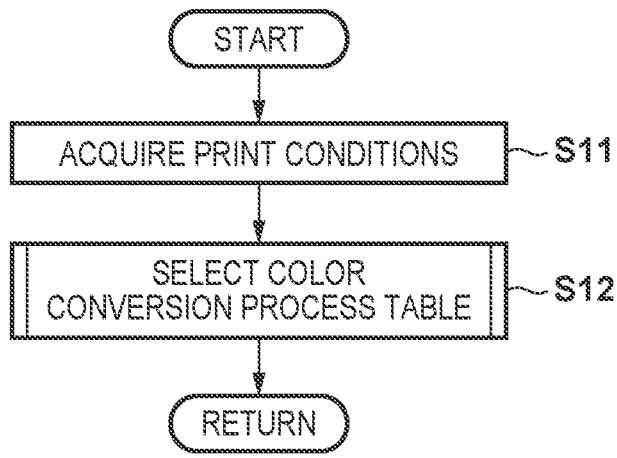
FIG. 10A is a flowchart showing a processing example of a CPU.
Figure 10B:
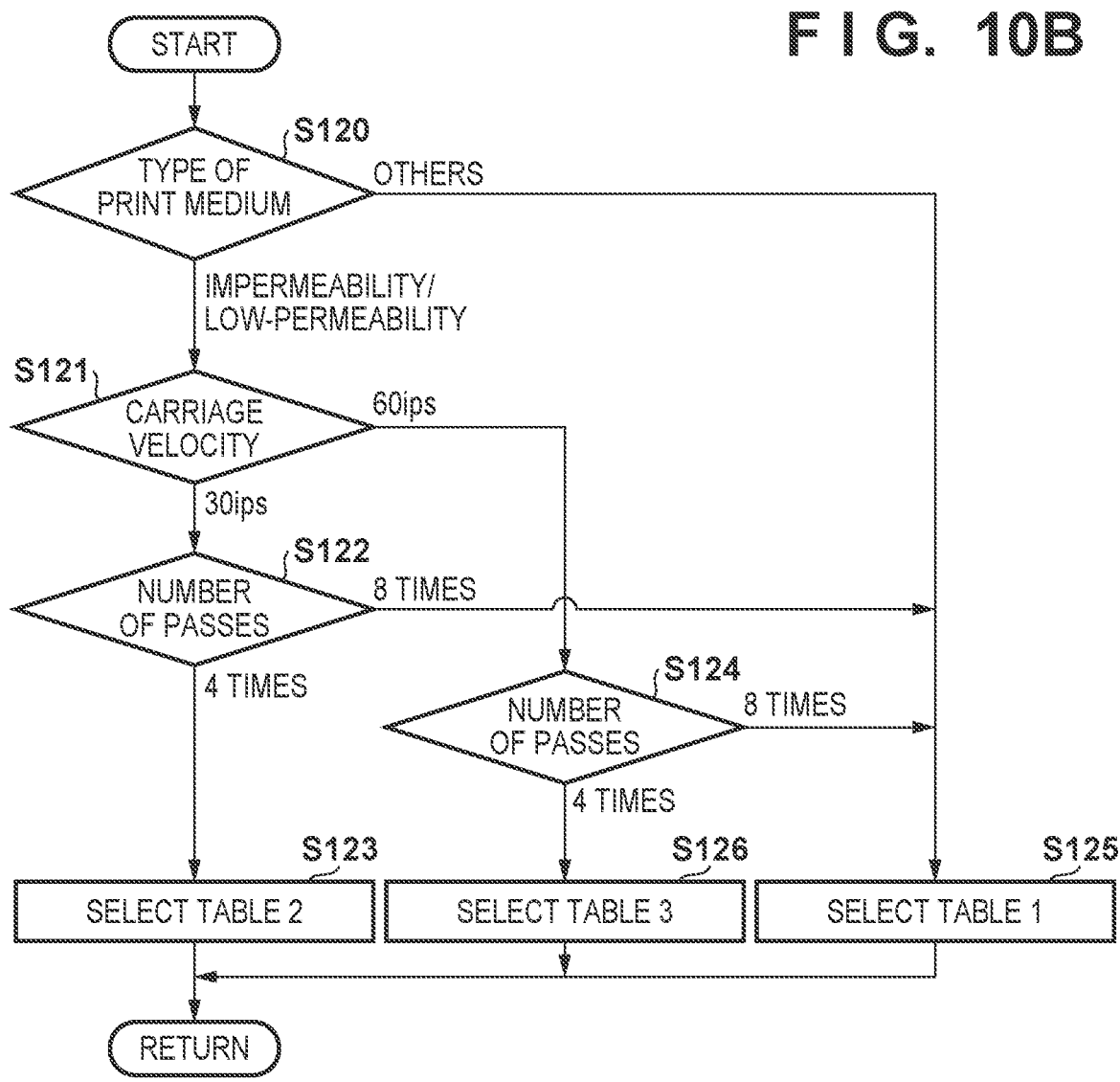
FIG. 10B is a flowchart showing the processing example of the CPU.

As described above, it is possible to suppress defective ejection and secure the gradation by using an appropriate color conversion process table in accordance with the print conditions. A process of selecting a color conversion process table will be explained below. FIGS. 10A and 10B are flowcharts showing processing examples of the CPU 301. These flowcharts are implemented by the CPU 301 by reading out a program stored in the ROM 302 to the RAM 303 and executing the program. For example, these flowcharts can be executed when the settings of the print apparatus 100 are changed, or before the flowchart shown in FIG. 5 is executed upon receiving a print command.

In S11, the CPU 301 acquires print conditions. For example, the CPU 301 reads out print conditions stored in the storage area of the print apparatus 100. Examples of the print conditions are the carriage velocity, the resolution, and the number of scans (the number of passes) for a unit area in multipass printing.

In S12, the CPU 301 selects a color conversion process table in accordance with the acquired print conditions. For example, the CPU 301 selects a color conversion process table so that the ejection frequency of the ejection port 30 of the photo magenta ink is equal to or smaller than a threshold when a print operation is performed under the acquired print conditions. The threshold can be set at a value in the range between, for example, 8 and 10 kHz. For example, when the carriage velocity is relatively low, the resolution is relatively low, and the number of passes is relatively large, the ejection frequency may become equal to or smaller than the threshold even if a color conversion process table in which the maximum print duty of the photo magenta ink is relatively large is selected. In a case like this, printing can be performed by holding a good gradation by selecting, for example, Table 1 described above. On the other hand, when the carriage velocity is relatively high, the resolution is relatively high, and the number of passes is relatively small, the ejection frequency often increases, so defective ejection can be suppressed by selecting, for example, Table 2 or 3 described above.

FIG. 10B is a flowchart showing a practical processing example of S12. FIG. 10B shows processing when selecting one of Tables 1 to 3 described above based on the print conditions. Note that for the sake of explanation, it is assumed that the carriage velocity is selected from 60 and 30 ips, the number of passes is selected from 4 and 8, and the resolution is constant at 600 dpi.

In S120, the CPU 301 confirms the type of print medium, advances to S121 if the print medium is an impermeable or low-permeability print medium, and advances to S125 and selects Table 1 if not. The CPU 301 acquires information about the type of print medium set by the user or the like, and performs determination based on the acquired information. If the print medium is neither an impermeable print medium nor a low-permeability print medium, the use of the treatment liquid is unnecessary, and this makes it unnecessary to limit the ejection frequency of the thin ink for suppressing adhesion of treatment liquid mist, so Table 1 giving priority to the gradation is selected.

In S121, the CPU 301 advances to S122 if the carriage velocity is 30 ips, and advances to S124 if the carriage velocity is 60 ips, based on the information acquired in S11. In S122, the CPU 301 advances to S123 and selects Table 2 if the number of passes is 4, and advances to S125 and selects Table 1 if the number of passes is 8, based on the information acquired in S11. That is, when the carriage velocity is 30 ips and the number of passes is 4, the maximum print duty per scan exceeds 40% if Table 1 is used as described above, so the maximum ejection frequency exceeds 8 kHz. Therefore, the ejection frequency is limited by selecting Table 2. On the other hand, when the carriage velocity is 30 ips and the number of passes is 8, the maximum ejection frequency does not exceed 8 kHz even when using Table 1, so the gradation is secured by selecting Table 1. Similarly, in S124, the CPU 301 advances to S126 and selects Table 3 if the number of passes is 4, and advances to S125 and selects Table 1 if the number of passes is 8, based on the information acquired in S11.

By selecting a table based on the above processing example, the printhead unit 3 is so controlled as to decrease the maximum print duty of the photo magenta ink when the number of passes is small, thereby limiting the ejection frequency when the number of passes is small. Also, by selecting a table based on the above processing example, the printhead unit 3 is so controlled as to decrease the maximum print duty of the photo magenta ink when the carriage velocity is high, thereby limiting the ejection frequency when the number of passes is small. That is, in this embodiment, the CPU 301 controls the printhead unit 3 such that the maximum print duty of the thin ink is changed in accordance with the print condition such as the carriage velocity, the number of passes, or the resolution, thereby changing the degree of control of the ejection frequency of the thin ink. From another viewpoint, this embodiment limits the ejection frequency of the thin ink by changing the ejection ratio of the thin ink to the thick ink in accordance with the print condition. This makes it possible to suppress the adhesion of treatment liquid mist caused by the thin ink.

When the carriage velocity is 60 ips, Table 3 is selected when the number of passes is 4, and Table 1 is selected when the number of passes is 8. Table 3 is set such that the application amount of the photo magenta ink is made larger than that when Table 1 is selected, in a gradation region in which the application amount of the photo magenta ink is limited because the maximum print duty of the photo magenta ink is relatively small. This makes it possible to secure the gradation even when the degree of limitation on the ejection frequency of the photo magenta ink is relatively large.

Figure 11:
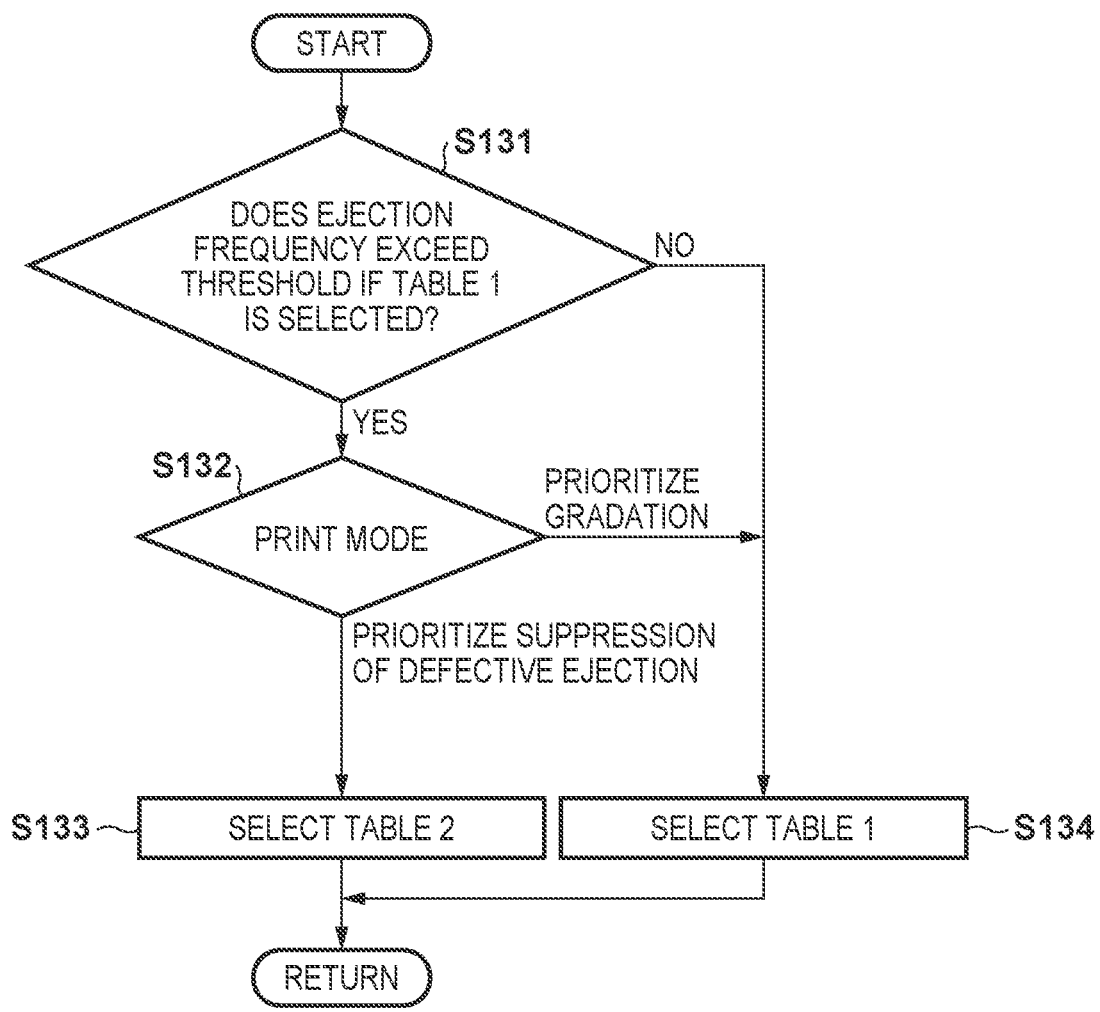
FIG. 11 is a flowchart showing the processing example of the CPU.

FIG. 11 is a flowchart showing another example of practical processing of S12. FIG. 11 shows a processing example in which in the print apparatus 100, the user can select a gradation priority mode as a print mode that gives priority to the gradation, and a defective ejection suppression priority mode as a print mode that gives priority to suppression of defective ejection.

In S131, the CPU 301 checks, based on the information acquired in S11, whether the ejection frequency of the photo magenta ink exceeds the threshold if Table 1 is selected. The CPU 301 advances to S132 if the ejection frequency exceeds the threshold, and advances to S134 and selects Table 1 if not. Based on the acquired carriage velocity, resolution, and number of passes, the CPU 301 checks whether the maximum ejection frequency exceeds the threshold (for example, whether the maximum ejection frequency exceeds 10 kHz or is 10 kHz or less) when the maximum print duty of the photo magenta ink is the maximum value D1. More specifically, the ejection frequency can be calculated by:

$$\text{Ejection frequency (kHz)} = \text{carriage velocity (ips)} \times \text{resolution (dpi)} \times \text{maximum print duty(\%)}/(\text{number of passes (passes)} \times 1000)$$

Therefore, the CPU 301 checks the ejection frequency based on this equation. If it is determined that the ejection frequency does not exceed the threshold, the situation is that defective ejection of the photo magenta ink hardly occurs even when using Table 1, so the CPU 301 selects Table 1.

In S132, the CPU 301 checks the print mode. The CPU 301 advances to S134 and selects Table 1 if the print mode is the gradation priority mode, and advances to S133 and selects the defective ejection suppression priority mode if the print mode is the defective ejection suppression priority mode. In this processing described above, if there is the possibility of defective ejection, the user can intentionally select whether to give priority to the gradation or to suppress defective ejection.

Note that in this embodiment, the ejection frequency of the thin ink is limited by switching the color conversion process tables, but another form can also be adopted. For example, it is also possible to prepare a plurality of arithmetic expressions defining the relationship between the gradation value and the print duty, and limit the ejection frequency of the thin ink by calculating the print duty based on an arithmetic expression corresponding to the print condition.

Furthermore, the positional relationship between the thick ink ejection port row and the thin ink ejection port row need only be a relationship in which the thick ink ejection port row is closer to the reactive liquid ejection port row than the thin ink ejection port row, based on the relationship with the reactive liquid ejection port row. Accordingly, ink colors are not limited to the relationship in which the thick ink is the magenta ink and the thin ink is the photo magenta ink.

When the thin ink ejection port row is closer to the reactive liquid ejection port row than the thick ink ejection port row, it is necessary to take account of the reactivity and a change in frequency at which defective ejection occurs. This will be explained below in Example 2.

EXAMPLE 2

In this example, a case in which another ejection port row is taken into consideration in addition to the above-described ink ejection port row closest to the treatment liquid and an adjacent ejection port row will be explained as the relationship between the position of the ejection port row and the color ink. More specifically, the ejection port rows of the magenta ink and the photo magenta ink have been explained in Example 1, but a case in which a black ink ejection port row is additionally taken into consideration will be explained in this example. Note that this example will be explained by taking black ink into consideration, but ink need only have a relatively high pigment concentration, so it is also possible to use yellow ink or another color ink.
(Ink Composition)

In this example, an examination was made by using the inks of Example 1 as magenta ink and a treatment liquid. Photo magenta ink and black ink will be explained below.
(Black Ink)
(1) Making of Pigment Dispersion First, an anionic polymer P-1 [a styrene/butylacrylate/acrylic acid copolymer (polymerization ratio (weight ratio) =30/40/30) having an acid value of 202 and a weight-average molecular weight of 6,500] was prepared. The anionic polymer P-1 was neutralized by an aqueous potassium hydroxide solution, and diluted with ion-exchanged water, thereby making an aqueous homogeneous 10-mass % polymer solution.

600 g of this polymer solution, 100 g of carbon black, and 300 g of ion-exchanged water were mixed, and the mixture was mechanically stirred for a predetermined time, and centrifugally separated to remove a non-dispersion containing coarse particles, thereby obtaining a black dispersion. The obtained black dispersion had a pigment concentration of 10 mass %.
(2) Making of Ink Ink was made by using the abovementioned black dispersion and a water-soluble resin microparticle dispersion, and adding the following components to them at a predetermined concentration. A pigment concentration was adjusted by preparing 5-mass % pigment ink. Similarly, to give the obtained water-soluble resin microparticles a concentration of 10 mass % in the ink, the following components were mixed, and dissolved and dispersed by sufficient stirring, and the dispersion was filtered under pressure through a microfilter (manufactured by FUJIFILM) having a pore size of 2.5 μm, thereby preparing black ink. Finally, the ink was adjusted to mainly have the following components.

(Black Ink Formula Example 1)

| | |
|---|---|
| Abovementioned black pigment | 5 parts |
| Abovementioned water-soluble resin microparticles | 10 parts |
| Zonyl FSO-100 (fluorosurfactant manufactured by DuPont) | 0.05 parts |
| 2-pyrrolidone | 20 parts |
| Acetylene glycol EO adduct (manufactured by Kawaken Fine Chemicals) | 0.5 parts |
| Ion-exchanged water | balance |

(Photo Magenta Ink)

In this example, a nonionic activator was added for the purpose of suppressing the mixing viscosity. This is to suppress defective ejection caused by high-frequency ejection of adjacent black ink. More specifically, the addition of the nonionic activator can improve the dispersion stability of a magenta pigment, and decrease the influence of a dispersion destroying material. Extensive studies have been made to find that the addition amount in the following formula has an effect of suppressing defective ejection. As a comparative example, formula example 3 shows a highly reactive photo magenta ink formula. This is an example in which water-soluble resin microparticles were added at a high concentration.

(Photo Magenta Ink Formula Example 2)

| | |
|---|---|
| Abovementioned magenta pigment | 0.5 parts |
| Abovementioned water-soluble resin microparticles | 1 part |
| Zonyl FSO-100 (fluorosurfactant manufactured by DuPont) | 0.05 parts |
| 2-pyrrolidone | 20 parts |
| Acetylene glycol EO adduct (manufactured by Kawaken Fine Chemicals) | 0.5 parts |
| BO-50 (NIKKOL) | 0.5 parts |
| Ion-exchanged water | balance |

(Photo Magenta Ink Formula Example 3 )

| | |
|---|---|
| Abovementioned magenta pigment | 0.5 parts |
| Abovementioned water-soluble resin microparticles | 1 part |
| Zonyl FSO-100 (fluorosurfactant manufactured by DuPont) | 0.05 parts |
| 2-pyrrolidone | 20 parts |
| Acetylene glycol EO adduct (manufactured by Kawaken Fine Chemicals) | 0.5 parts |
| BO-50 (NIKKOL) | 0.5 parts |
| Ion-exchanged water | balance |

(Evaluation of Ink Physical Properties)

The mixing viscosities of the three types of inks described above were as shown in Table 3 below. Note that "Before mixing" in this table represents the viscosity before each photo magenta ink formula was mixed with the treatment liquid. The unit is mPa·s.

TABLE 3

| | Before mixing | After 1 min | After 10 min |
|---|---|---|---|
| Photo magenta ink formula example 1 | 1.8 | 10.5 | 35.6 |
| Photo magenta ink formula example 2 | 2.1 | 2.2 | 2.1 |
| Photo magenta ink formula example 3 | 3.3 | 48.1 | 65.0 |

Table 3 shows that it was possible to classify the evaluation results into a case in which the reaction instantly occurred, a case in which the reaction gently occurred, and a case in which almost no reaction occurred, in accordance with the differences between the photo magenta ink formulas.

In formula example 1, the viscosity largely rose in 10 min, so thickening gently occurred. In formula example 3, thickening was already conspicuous in 1 min, so the reaction instantly occurred. In formula example 2, almost no thickening occurred until 10 min, that is, the reaction was very low. In this example, changes in reactivity and occurrence frequency of defective ejection will be explained by switching the abovementioned three types of photo magenta inks.

(Head Configuration)

In this example, an image is formed on a print medium by ejecting the above-described inks from ejection ports through the head. In this case, the positional relationship between the treatment liquid and each color ink largely affects the occurrence frequency of defective ejection. In this example, the treatment liquid and each color ink were arranged in the positions shown in FIG. 2.

In this example, the magenta ink having a relatively high reactivity was used in an ejection port row relatively closest to the treatment liquid. Generally, color ink having a high reactivity is placed in a position far from a reactive liquid in many cases. As a comparative example, the occurrence frequencies of defective ejection were compared based on the level shown in Table 4 below. Note that in Table 4, "Color ink ejection port 1" is an ejection port close to the treatment liquid ejection port, and "Color ink ejection port 2" and "Color ink ejection port 3" are so arranged as to be gradually spaced apart from the reactive liquid ejection port in this order.

TABLE 4

| | Color ink ejection port 1 | Color ink ejection port 2 | Color ink ejection port 3 |
|---|---|---|---|
| Example 4 | Formula example 1 Magenta ink | Formula example 2 Photo magenta ink | Formula example 1 Black ink |
| Comparative Example 3 | Formula example 1 Magenta ink | Formula example 1 Photo magenta ink | Formula example 1 Black ink |
| Comparative Example 4 | Formula example 1 Magenta ink | Formula example 3 Photo magenta ink | Formula example 1 Black ink |
| Comparative Example 5 | Formula example 1 Magenta ink | Formula example 1 Black ink | Formula example 2 Photo magenta ink |

TABLE 4-continued

|  | Color ink ejection port 1 | Color ink ejection port 2 | Color ink ejection port 3 |
|---|---|---|---|
| Comparative Example 6 | Formula example 1 Magenta ink | Formula example 1 Black ink | Formula example 2 Photo magenta ink |
| Comparative Example 7 | Formula example 2 Photo magenta ink | Formula example 1 Magenta ink | Formula example 1 Black ink |

(Print Method)

In this example, an image was formed in each predetermined region by 4-pass printing scan of the multipass printing process. Also, the carriage velocity was 30 ips, and Table 2 shown in Example 1 was used as the color conversion process and the like.

(Results)

Table 5 below summarizes the ejection port placements and the corresponding occurrence frequencies of defective ejection according to this example.

TABLE 5

|  | Occurrence frequency of defective ejection |
|---|---|
| Example 4 | AA |
| Comparative Example 3 | A |
| Comparative Example 4 | B |
| Comparative Example 5 | C |
| Comparative Example 6 | C |
| Comparative Example 7 | C |

Table 5 shows that the ejection port placement of this example had a good result. Note that in the comparative examples, defective ejection was notable in the position of color ink ejection port 2 for ejecting color ink 3. As it was assumed from the positional relationship with the ejection port of defective ejection, curl-up of the treatment liquid by an eddy current was the cause of defective ejection. On the other hand, this example adopted low-reactivity ink as color ink 2 (photo magenta ink), and was able to suppress defective ejection of color ink 2 (photo magenta ink) by ejecting color ink 3 (black ink). That is, the colors of the inks used in the explanation of this example are not limited. Thick ink generally has a high reactivity. The object of this example is to arrange thick ink in color ink ejection ports 1 and 3, and thin ink in color ink ejection port 2. Another object of this example is to prevent thick inks from being arranged adjacent to each other. Table 6 shows examples of an arrangement of thick inks and thin inks capable of suppressing defective ejection. Note that the thick inks in Table 6 are cyan ink, magenta ink, yellow ink, and black ink, and normally have a pigment concentration of 1% or more. The thin inks in Table 6 are photo cyan ink, photo magenta ink, gray ink, and photo gray ink, and normally have a pigment concentration of less than 1%. Note that the thin inks include ink containing no pigment as will be described in detail in other examples.

TABLE 6

|  | Color ink ejection port 1 | Color ink ejection port 2 | Color ink ejection port 3 | Necessity of limitation on ejection frequency |
|---|---|---|---|---|
| Example 5 | Thin ink | Thin ink | Thin ink | Unnecessary |
| Example 6 | Thick ink | Thin ink | Thin ink | Necessary (color ink ejection port 2) |
| Example 7 | Thin ink | Thick ink | Thin ink | Necessary (color ink ejection port 3) |
| Example 8 | Thin ink | Thin ink | Thick ink | Unnecessary |
| Example 9 | Thick ink | Thin ink | Thick ink | Necessary (color ink ejection port 2) |

Other Examples

In Example 1, the ejection frequency of the thin ink is limited to suppress defective ejection of color ink, and the selection of a color conversion process table for securing the gradation is explained, from the relationship between the treatment liquid ejection port and the color ink ejection port. More specifically, the thick ink was placed in a color ink ejection port row close to the treatment liquid ejection port, and the thin ink was placed in a far position, thereby limiting the ejection frequency of the thin ink and performing the color conversion process for the thick ink in order to secure the gradation.

In Example 2, the relationship between the reactivity to the reactive liquid and the ejection port position is explained in a case in which the number of color inks has increased. More specifically, a case in which three color inks are adjacent to each other is explained. More specifically, the limitation on the ejection frequency of ink placed in the center of the three inks and the suppression of defective ejection by reactivity control are explained.

The case in which the ink placed in the center is photo magenta ink is explained, but this ink is not limited to photo magenta ink, and the same effect can be obtained by ink having limited reactivity. In this example, therefore, a case in which transparent ink containing no pigment or a very small amount of a pigment is placed in the center will be explained. For the convenience of explanation, ink containing no pigment will be described in a formula example.

This case is advantageous in that defective ejection is suppressed more easily, there is no concern about the above-described gradation, and the degree of freedom is high for the use of thick ink and thin ink. The formula of the transparent ink is as follows.

(Transparent Ink Formula Example 1)

| Abovementioned water-soluble resin microparticles | 1 part |
|---|---|
| Zonyl FSO-100 (fluorosurfactant manufactured by DuPont) | 0.05 parts |
| 2-pyrrolidone | 20 parts |
| Acetylene glycol EO adduct (manufactured by Kawaken Fine Chemicals) | 0.5 parts |
| BO-50 (NIKKOL) | 0.5 parts |
| Ion-exchanged water | balance |

Note that formula example 1 was used for each of magenta ink, black ink, and a treatment liquid. Note also that as the relationship between the ejection port row and the ink color, color ink 2 of this example was replaced with the transparent ink in above-described Table 4. Furthermore, the same print method as described in Examples 1 and 2 was used as a print method.

When the occurrence frequency of defective ejection of this example was evaluated, the result was AA. From this result and the results of Examples 1 and 2 described above, it was confirmed that an effect equal to or greater than those of the above examples can be obtained even when using transparent ink. Also, the case in which three color ink ejection port rows are close to each other is explained in Example 2. A case in which four or more color ink ejection port rows are adjacent to each other will be explained below.

It is difficult to limit the ejection frequency of thick ink. This is so because thick ink is used for the purpose of increasing the print duty and improving the color development. That is, it is difficult to arrange thick inks adjacent to each other in order to limit the ejection frequency. However, four or more ejection port rows can be arranged close to each other by limiting adjacency between thick inks. This makes it possible to decrease the carriage size.

In this embodiment as has been explained above, selecting Table 2 in which the maximum print duty of photo magenta ink is smaller than that in Table 1 is equivalent to selecting a table in which the degree of limitation on the ejection frequency of photo magenta ink is larger than a case in which the gradation is given priority. In this embodiment, the print apparatus 100 controls printing of the printhead unit 3 so as to change the degree of limitation on the ejection frequency of photo magenta ink corresponding to the specific ejection port in accordance with the print condition. According to this embodiment, therefore, it is possible to prevent the ejection frequency of photo magenta ink from exceeding a predetermined value, for example, a value of 8 to 10 kHz at which the influence of a self-airflow can occur, and to suppress defective ejection of ink caused by the adhesion of treatment liquid mist. In addition, this configuration does not require any mist suction mechanism or the like, so defective ejection of ink can be suppressed with a simple configuration.

Also, this embodiment limits the ejection frequency of not magenta ink (thick ink) having a relatively high pigment concentration but photo magenta ink (thin ink) having a relatively low pigment concentration. This makes it possible to suppress defective ejection caused by ejection of thin ink while securing the color development of thick ink. Furthermore, in this embodiment, the ejection port row 35M of the magenta ink is positioned closer to the ejection port row 35Tr of the treatment liquid than the ejection port row 35m of the photo magenta ink. Consequently, the adhesion of mist caused by a self-airflow generated by ink ejection from the ejection port row 35M occurs in a region having no ejection port row between the ejection port rows 35r and 35M. Accordingly, defective ejection caused by the ejection of thick ink can be suppressed without particularly limiting the ejection frequency of the ejection port row of thick ink.

Other Embodiments

The abovementioned embodiment has been explained by taking the print apparatus using the inkjet printing process as an example. However, the print apparatus can also be, for example, a single-function printer having only a print function, or a multi-function printer having a plurality of functions such as a print function, a FAX function, and a scanner function. In addition, the print apparatus can be a manufacturing apparatus for manufacturing, for example, a color filter, an electronic device, an optical device, or a microstructure by using a predetermined printing process.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

Addition

The abovementioned embodiment discloses at least a print apparatus, a control method of the same, a printhead, and a print system.

(Item 1)

A print apparatus comprising:
a print unit including a reactive liquid element row in which a plurality of print elements for applying a reactive liquid containing a component that reacts with a coloring material in ink are arrayed in a first direction, a first element row in which a plurality of print elements for applying first ink are arrayed in the first direction, and a second element row in which a plurality of print elements for applying second ink whose reactivity to the reactive liquid is lower than that of the first ink are arrayed in the first direction, the reactive liquid element row, the first element row, and the second element row being arrayed in this order in a second direction perpendicular to the first direction;
a scan unit configured to scan the print unit in the second direction relatively to a print medium; and
a print control unit configured to control a print operation by the print unit such that a ratio of the number of pixels permitted to eject the second ink to the number of pixels in a predetermined region on the print medium does not exceed a threshold.

(Item 2)

The apparatus according to item 1, wherein the second ink is ink having the same hue as that of the first ink and a coloring material concentration lower than that of the first ink.

(Item 3)

The apparatus according to item 1 or 2, further comprising a determination unit configured to determine an application amount of the first ink and an application amount of the second ink based on input image data, wherein the print control unit controls the print operation based on the application amount determined by the determination unit.

(Item 4)
The apparatus according to item 3, wherein the determination unit determines the application amount of the first ink and the application amount of the second ink in accordance with a print condition of the print operation.

(Item 5)
The apparatus according to item 4, wherein the determination unit determines the application amount of the second ink such that the application amount does not exceed the threshold determined for each print condition.

(Item 6)
The apparatus according to item 5, wherein
the print unit completes printing of an image by a plurality of times of scan in a unit region on the print medium,
the print condition includes the number of scans in the unit region, and
the threshold determined for a print condition in which the number of scans is a first number of scans is larger than the threshold determined for a print condition in which the number of scans is a second number of scans smaller than the first number of scans.

(Item 7)
The apparatus according to item 5, wherein
the print condition includes a scan rate of the print unit, and
the threshold determined for a print condition in which the scan rate is a first scan rate is larger than the threshold determined for a print condition in which the scan rate is a second scan rate higher than the first scan rate.

(Item 8)
The apparatus according to item 3, wherein
the print control unit performs first control in which the threshold is a first value, and second control in which the threshold is a second value smaller than the first value, in accordance with a print condition of the print operation, and
the application amount of the first ink in a gradation region in which the application amount of the second ink is limited in the second control is larger than the application amount of the first ink in the gradation region in which the application amount of the second ink is limited in the first control.

(Item 9)
The apparatus according to any one of items 1 to 8, wherein the print control unit causes the print unit to apply the reactive liquid to a print medium satisfying a condition about permeability to aqueous ink.

(Item 10)
The apparatus according to item 9, wherein the condition about permeability to aqueous ink is that an ink transfer amount obtained by the Bristow procedure has a value smaller than 20 ml/m$^2$.

(Item 11)
The apparatus according to any one of items 1 to 10, wherein a distance between the first element row and the reactive liquid element row in the second direction is larger than a distance between the first element row and the second element row in the second direction.

(Item 12)
The apparatus according to any one of items 1 to 11, wherein the print unit includes a first printhead in which the reactive liquid element row is formed, and a second print head in which the first element row and the second element row are formed.

(Item 13)
The apparatus according to item 12, wherein the second printhead further includes a third element row in which a plurality of print elements for applying third ink having a hue different from that of the first ink and the second ink are arrayed in the first direction.

(Item 14)
The apparatus according to item 13, wherein
in the second direction, a distance between the third element row and the reactive liquid element row is larger than a distance between the second element row and the reactive liquid element row, and a distance between the first element row and the reactive liquid element row is larger than a distance between the second element row and the third element row, and
reactivity between the third ink and the reactive liquid is higher than reactivity between the second ink and the reactive liquid.

(Item 15)
The apparatus according to any one of items 1 to 14, wherein reactivity between ink and the reactive liquid is a degree of a viscosity rise of the ink after the ink is mixed with the reactive liquid.

(Item 16)
The apparatus according to any one of items 1 to 15, wherein the reactive liquid contains a reactive component that aggregates or gelates a coloring material in ink.

(Item 17)
The apparatus according to any one of items 1 to 16, wherein
the first ink and the second ink contain a pigment as a coloring material, and
a pigment concentration in the first ink is higher than a pigment concentration in the second ink.

(Item 18)
The apparatus according to any one of items 1 to 17, wherein
the first ink contains a pigment, and
the second ink does not contain a pigment.

(Item 19)
The apparatus according to item 4, wherein the determination unit determines the application amount of the first ink and the application amount of the second ink by switching tables showing the ratio to a gradation value of the second ink.

(Item 20)
The apparatus according to any one of items 1 to 19, wherein the print control unit controls the print operation such that a frequency of a print element for applying the second ink to the predetermined region is not more than 10 kHz.

(Item 21)
A control method of a print apparatus including:
a print unit including a reactive liquid element row in which a plurality of print elements for applying a reactive liquid containing a component that reacts with a coloring material in ink are arrayed in a first direction, a first element row in which a plurality of print elements for applying first ink are arrayed in the first direction, and a second element row in which a plurality of print elements for applying second ink whose reactivity to the reactive liquid is lower than that of the first ink are arrayed in the first direction, the reactive liquid element row, the first element row, and the second element row being arrayed in this order in a second direction perpendicular to the first direction, the method comprising:

scanning the print unit in the second direction relatively to a print medium; and controlling a print operation by the print unit such that a ratio of the number of pixels permitted to eject the second ink to the number of pixels in a predetermined region on the print medium does not exceed a threshold.

(Item 22)

A printhead comprising a reactive liquid element row in which a plurality of print elements for applying a reactive liquid containing a component that reacts with a coloring material in ink are arrayed in a first direction, a first element row in which a plurality of print elements for applying first ink are arrayed in the first direction, and a second element row in which a plurality of print elements for applying second ink whose reactivity to the reactive liquid is lower than that of the first ink are arrayed in the first direction, wherein the reactive liquid element row, the first element row, and the second element row are arrayed in this order in a second direction perpendicular to the first direction.

(Item 23)

The printhead according to item 22, wherein the second ink has the same hue as that of the first ink, and a coloring material concentration of the second ink is lower than that of the first ink.

(Item 24)

A print system comprising:

a print apparatus including a print unit including a reactive liquid element row in which a plurality of print elements for applying a reactive liquid containing a component that reacts with a coloring material in ink are arrayed in a first direction, a first element row in which a plurality of print elements for applying first ink are arrayed in the first direction, and a second element row in which a plurality of print elements for applying second ink whose reactivity to the reactive liquid is lower than that of the first ink are arrayed in the first direction, the reactive liquid element row, the first element row, and the second element row being arrayed in this order in a second direction perpendicular to the first direction, a scan unit configured to scan the print unit in the second direction relatively to a print medium, and a print control unit configured to control a print operation by the print unit; and an information processing apparatus including a determination unit configured to determine an application amount of the second ink based on input image data, such that the number of ejections per unit time of the second ink does not exceed a threshold, wherein the print control unit controls printing by the print unit based on the application amount determined by the determination unit.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-154711, filed Sep. 22, 2021, and No. 2022-112573, filed Jul. 13, 2022, which are hereby incorporated by reference herein in their entirety.

What is claimed is:

1. A print apparatus comprising:
a print unit including a reactive liquid element row in which a plurality of print elements for applying a reactive liquid containing a component that reacts with a coloring material in ink are arrayed in a first direction, a first element row in which a plurality of print elements for applying a first ink are arrayed in the first direction, and a second element row in which a plurality of print elements for applying a second ink whose reactivity to the reactive liquid is lower than that of the first ink are arrayed in the first direction, the reactive liquid element row, the first element row, and the second element row being arrayed in the order as listed in a second direction perpendicular to the first direction;
a scan unit configured to scan the print unit in the second direction relatively to a print medium; and
a print control unit configured to control a print operation by the print unit based on a print condition including a scan rate of the print unit and the number of scans in a unit region of the print medium such that an ejection frequency of the second ink does not exceed a threshold.

2. The apparatus according to claim 1, wherein the second ink is ink having the same hue as that of the first ink and a coloring material concentration lower than that of the first ink.

3. The apparatus according to claim 1, wherein the print control unit determines an application amount of the first ink and an application amount of the second ink based on input image data, and controls the print operation based on the determined application amount.

4. The apparatus according to claim 1, wherein the print control unit controls the print operation such that the ejection frequency of the second ink does not exceed the threshold, regardless of whether the scan rate is a first scan rate or a second scan rate which is different from the first scan rate.

5. The apparatus according to claim 3, wherein the print control unit selects one table from a plurality of tables with regard to the application amount of each of the first ink and the second ink.

6. The apparatus according to claim 1, wherein
the threshold is a first value when the number of scans is a first number,
the threshold is a second value when the number of scans is a second number less than the first number, and
the first value is higher than the second value.

7. The apparatus according to claim 1, wherein
the threshold is a first value when the scan rate is a first scan rate,
the threshold is a second value when the scan rate is a second scan rate higher than the first scan rate, and
the first value is higher than the second value.

8. The apparatus according to claim 3, wherein
the print control unit performs first control in which the threshold is a first value, and second control in which the threshold is a second value lower than the first value, in accordance with the print condition of the print operation, and
the application amount of the first ink in a gradation region in which the application amount of the second ink is limited in the second control is greater than the application amount of the first ink in the gradation region in which the application amount of the second ink is limited in the first control.

9. The apparatus according to claim 1, wherein the print control unit causes the print unit to apply the reactive liquid to a print medium satisfying a condition regarding permeability to aqueous ink.

10. The apparatus according to claim 9, wherein the condition regarding permeability to aqueous ink is that an ink transfer amount obtained by the Bristow procedure has a value smaller than 20 ml/m$^2$.

11. The apparatus according to claim 1, wherein a distance between the first element row and the reactive liquid element row in the second direction is longer than a distance between the first element row and the second element row in the second direction.

12. The apparatus according to claim 1, wherein the print unit includes a first printhead in which the reactive liquid element row is formed, and a second print head in which the first element row and the second element row are formed.

13. The apparatus according to claim 12, wherein the second printhead further includes a third element row in which a plurality of print elements for applying a third ink having a hue different from that of the first ink and the second ink are arrayed in the first direction.

14. The apparatus according to claim 13, wherein
in the second direction, a distance between the third element row and the reactive liquid element row is longer than a distance between the second element row and the reactive liquid element row, and a distance between the first element row and the reactive liquid element row is longer than a distance between the second element row and the third element row, and
reactivity between the third ink and the reactive liquid is higher than reactivity between the second ink and the reactive liquid.

15. The apparatus according to claim 1, wherein reactivity between ink and the reactive liquid is a degree of a viscosity rise of the ink after the ink is mixed with the reactive liquid.

16. The apparatus according to claim 1, wherein the reactive liquid contains a reactive component that aggregates or gelates a coloring material in ink.

17. The apparatus according to claim 1, wherein
the first ink and the second ink contain a pigment as a coloring material, and
a pigment concentration in the first ink is higher than a pigment concentration in the second ink.

18. The apparatus according to claim 1, wherein
the first ink contains a pigment, and
the second ink does not contain a pigment.

19. The apparatus according to claim 3, wherein the print control unit determines the application amount of the first ink and the application amount of the second ink by switching tables, each table relating a print duty to a gradation value of the second ink, and
the print duty is a ratio of the number of pixels to which the second ink is permitted to be ejected to the number of pixels in a predetermined region on the print medium.

20. The apparatus according to claim 1, wherein the print control unit controls the print operation such that the ejection frequency of the second ink is not higher than 10 kHz.

21. A control method of a print apparatus including:
a print unit including a reactive liquid element row in which a plurality of print elements for applying a reactive liquid containing a component that reacts with a coloring material in ink are arrayed in a first direction, a first element row in which a plurality of print elements for applying a first ink are arrayed in the first direction, and a second element row in which a plurality of print elements for applying a second ink whose reactivity to the reactive liquid is lower than that of the first ink are arrayed in the first direction, the reactive liquid element row, the first element row, and the second element row being arrayed in the order as listed in a second direction perpendicular to the first direction, the method comprising:
scanning the print unit in the second direction relatively to a print medium; and
controlling a print operation by the print unit based on a print condition including a scan rate of the print unit and the number of scans in a unit region of the print medium such that an ejection frequency of the second ink does not exceed a threshold.

22. A print system comprising:
a print apparatus including:
a print unit including a reactive liquid element row in which a plurality of print elements for applying a reactive liquid containing a component that reacts with a coloring material in ink are arrayed in a first direction, a first element row in which a plurality of print elements for applying a first ink are arrayed in the first direction, and a second element row in which a plurality of print elements for applying a second ink whose reactivity to the reactive liquid is lower than that of the first ink are arrayed in the first direction, the reactive liquid element row, the first element row, and the second element row being arrayed in the order as listed in a second direction perpendicular to the first direction,
a scan unit configured to scan the print unit in the second direction relatively to a print medium, and
a print control unit configured to control a print operation by the print unit; and
an information processing apparatus including a determination unit configured to determine an application amount of the second ink based on input image data and a print condition including a scan rate of the print unit and the number of scans in a unit region of the print medium, such that an ejection frequency of the second ink does not exceed a threshold,
wherein the print control unit controls printing by the print unit based on the application amount determined by the determination unit.

* * * * *